US012794624B2

(12) United States Patent
Wu et al.

(10) Patent No.: US 12,794,624 B2
(45) Date of Patent: Nov. 10, 2026

(54) TEMPORAL DOMAIN PRECODING CONFIGURATION FOR WIRELESS COMMUNICATIONS

(71) Applicant: QUALCOMM Incorporated, San Diego, CA (US)

(72) Inventors: Liangming Wu, Beijing (CN); Jing Dai, Beijing (CN); Wei Xi, Beijing (CN); Wanshi Chen, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 18/728,047

(22) PCT Filed: Apr. 1, 2022

(86) PCT No.: PCT/CN2022/084769
§ 371 (c)(1),
(2) Date: Jul. 10, 2024

(87) PCT Pub. No.: WO2023/184469
PCT Pub. Date: Oct. 5, 2023

(65) Prior Publication Data

US 2025/0096969 A1 Mar. 20, 2025

(51) Int. Cl.
*H04L 5/00* (2006.01)

(52) U.S. Cl.
CPC .......... *H04L 5/0048* (2013.01); *H04L 5/0053* (2013.01)

(58) Field of Classification Search
CPC . H04L 5/0048; H04L 5/0053; H04L 25/0222; H04L 25/0224; H04L 25/03343;
(Continued)

(56) References Cited

U.S. PATENT DOCUMENTS

2009/0154577 A1 6/2009 Lindoff et al.
2021/0051508 A1* 2/2021 Chung .................. H04L 5/0048
(Continued)

FOREIGN PATENT DOCUMENTS

CN 112054825 A 12/2020
WO WO-2021007695 A1 * 1/2021 ............. H04B 7/063
WO WO-2021008450 A1 1/2021

OTHER PUBLICATIONS

International Search Report and Written Opinion—PCT/CN2022/084769—ISA/EPO—Nov. 25, 2022.
(Continued)

*Primary Examiner* — Ricky Q Ngo
*Assistant Examiner* — Kabir U Jahangir
(74) *Attorney, Agent, or Firm* — Holland & Hart LLP/QUALCOMM Incorporated

(57) ABSTRACT

Methods, systems, and devices for wireless communications are described. The method may include a first network node receiving a configuration message for a report by the first network node of parameters for a temporal domain precoder. The configuration message may indicate a range of Doppler frequencies, a resolution associated with the range of Doppler frequencies, or a quantity of the parameters to be reported. The first network node may estimate a communications channel and select one or more bins within the range of Doppler frequencies based on the channel estimation. For each selected bin, the first network node may determine a corresponding discrete Fourier transform (DFT) vector and transmit a report indicating the corresponding DFT vector.

30 Claims, 17 Drawing Sheets

(58) Field of Classification Search
CPC ..... H04L 27/2636; H04L 1/0026; H04L 1/06; H04L 27/2615
See application file for complete search history.

(56) References Cited

U.S. PATENT DOCUMENTS

| | | | |
|---|---|---|---|
| 2021/0143885 A1 | 5/2021 | Gro mann et al. | |
| 2024/0171229 A1* | 5/2024 | Ramireddy .......... | H04B 7/0417 |

OTHER PUBLICATIONS

NTT Docomo Inc (Rapporteur), et al., "RAN WG's Progress on NR Technology SI in the January Ad- Hoc Meeting", 3GPP TSG-RAN WG2 #97, R2-1701059, 3rd Generation Partnership Project, Mobile Competence Centre, 650, Route Des Lucioles, F-06921 Sophia-Antipolis Cedex, France, vol. RAN WG2, No. Athens, Greece, Feb. 13, 2017-Feb. 17, 2017 Feb. 12, 2017, XP051211790, pp. 1-38.

* cited by examiner

1400

TEMPORAL DOMAIN PRECODING CONFIGURATION FOR WIRELESS COMMUNICATIONS

CROSS REFERENCE

The present application is a 371 national stage filing of International PCT Application No. PCT/CN2022/084769 by WU et al. entitled "TEMPORAL DOMAIN PRECODING CONFIGURATION FOR WIRELESS COMMUNICATIONS," filed Apr. 1, 2022, which is assigned to the assignee hereof, and which is expressly incorporated by reference in its entirety herein.

FIELD OF TECHNOLOGY

The following relates to wireless communications, including temporal domain precoding configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a base station may perform a precoding operation to reduce the peak to average power ratio (PAPR) of a downlink signal. The base station may perform the precoding operation based on information (e.g., channel state information (CSI) determined by the UE.

SUMMARY

The described techniques relate to improved methods, systems, devices, and apparatuses that support temporal domain precoding configuration. For example, the described techniques provide for configuring a user equipment (UE) to report parameters associated with precoding in a temporal domain to a base station. In some examples, the UE may receive a configuration message from the base station to report the parameters, where the configuration message may include one or more a range of Doppler frequencies, a resolution associated with the range of Doppler frequencies, and a quantity of the parameters. The UE may estimate a channel (e.g., downlink channel between the UE and the base station) based on a received set of reference signals and select one or more Doppler frequency bins from among a set of Doppler frequency bins included in the range of Doppler frequencies. Using the selected Doppler bin, the UE may determine a discrete Fourier transform (DFT) vector and transmit an indication of the DFT vector the base station in a report such that the base station may perform precoding in the temporal domain.

A method for wireless communications at a first network node is described. The method may include receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report, estimating a communications channel between the first network node and a second network node based on receiving a set of multiple reference signals, selecting, based on the quantity of the parameters for the first network node to report and estimating the communications channel, one or more quantized frequencies within the range of Doppler frequencies, determining, for each selected quantized frequency within the range of Doppler frequencies, a corresponding DFT vector, where the parameters for the temporal domain precoder include the corresponding DFT vector for each selected quantized frequency within the range of Doppler frequencies, and transmitting the report including the parameters for the temporal domain precoder.

An apparatus for wireless communications at a first network node is described. The apparatus may include memory, a transceiver, and at least one processor of the first network node, the at least one processor coupled with the memory and the transceiver. The at least one processor may be configured to cause the apparatus to receive a configuration message for a report by the first network node of parameters for a temporal domain precoder, where the configuration message indicates one or more of a range of Doppler frequencies, a resolution associated with the range of Doppler frequencies, or a quantity of the parameters for the first network node to report, estimate a communications channel between the first network node and a second network node based on receiving a set of multiple reference signals, select, based on the quantity of the parameters for the first network node to report and estimating the communications channel, one or more quantized frequencies within the range of Doppler frequencies, determine, for each selected quantized frequency within the range of Doppler frequencies, a corresponding DFT vector, where the parameters for the temporal domain precoder include the corresponding DFT vector for each selected quantized frequency within the range of Doppler frequencies, and transmit the report including the parameters for the temporal domain precoder.

Another apparatus for wireless communications at a first network node is described. The apparatus may include means for receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report, means for estimating a communications channel between the first network node and a second network node based on receiving a set of multiple reference signals, means for selecting, based on the quantity of the parameters for the first network node to report and estimating the communications channel, one or more quantized frequencies within the range of Doppler frequencies, means for determining, for each selected quantized frequency within the range of Doppler frequencies, a corresponding DFT vector, where the parameters for the temporal domain precoder include the corresponding DFT vector for each selected quantized frequency within the range of Doppler frequencies, and means for transmitting the report including the parameters for the temporal domain precoder.

A non-transitory computer-readable medium storing code for wireless communications at a first network node is described. The code may include instructions executable by a processor to receive a configuration message for a report by the first network node of parameters for a temporal domain precoder, where the configuration message indicates one or more of a range of Doppler frequencies, a resolution associated with the range of Doppler frequencies, or a quantity of the parameters for the first network node to report, estimate a communications channel between the first network node and a second network node based on receiving a set of multiple reference signals, select, based on the quantity of the parameters for the first network node to report and estimating the communications channel, one or more quantized frequencies within the range of Doppler frequencies, determine, for each selected quantized frequency within the range of Doppler frequencies, a corresponding DFT vector, where the parameters for the temporal domain precoder include the corresponding DFT vector for each selected quantized frequency within the range of Doppler frequencies, and transmit the report including the parameters for the temporal domain precoder.

In some examples of the method, apparatuses, and non-transitory computer-readable medium described herein, selecting the one or more quantized frequencies within the range of Doppler frequencies may include operations, features, means, or instructions for determining, for each directional beam of a set of directional beams or for each power delay profile of a set of power delay profiles, one or more Doppler frequencies that correspond to respective received power values that may be above a threshold and selecting, for each directional beam of the set or for each power delay profile of the set, the one or more quantized frequencies based at least on the one or more determined Doppler frequencies being within frequency ranges that include the one or more quantized frequencies.

In some examples of the method, apparatuses, and non-transitory computer-readable medium described herein, receiving the set of multiple reference signals may include operations, features, means, or instructions for receiving the set of multiple reference signals according to a periodicity and a quantity of reference signal occasions, where the quantity of reference signal occasions may be greater than one.

Some examples of the method, apparatuses, and non-transitory computer-readable medium described herein may further include operations, features, means, or instructions for bundling the set of multiple reference signals, where estimating the communications channel is based on the bundling.

In some examples of the method, apparatuses, and non-transitory computer-readable medium described herein, the configuration message further includes an indication of the periodicity and the quantity of reference signal occasions.

Some examples of the method, apparatuses, and non-transitory computer-readable medium described herein may further include operations, features, means, or instructions for determining a mapping between one or both of the periodicity and the quantity of reference signal occasions and at least one of the range of Doppler frequencies, the resolution within the range of Doppler frequencies, or a quantity of quantized frequencies within the range of Doppler frequencies, where the configuration message indicates one or more of the range of Doppler frequencies, the resolution associated with the range of Doppler frequencies, or the quantity of the parameters for the first network node to report based on indicating one or both of the periodicity and the quantity of reference signal occasions.

In some examples of the method, apparatuses, and non-transitory computer-readable medium described herein, the corresponding DFT vectors each include a DFT basis representative of a quantized frequency of the one or more quantized frequencies.

Some examples of the method, apparatuses, and non-transitory computer-readable medium described herein may further include operations, features, means, or instructions for determining a respective Doppler coefficient for each of the corresponding DFT vectors, where the report further includes the respective Doppler coefficients.

Some examples of the method, apparatuses, and non-transitory computer-readable medium described herein may further include operations, features, means, or instructions for determining a highest Doppler frequency and a lowest Doppler frequency based on estimating the communications channel, where the highest Doppler frequency and the lowest Doppler frequency may be within the range of Doppler frequencies, and where the report further includes an indication of the highest Doppler frequency and the lowest Doppler frequency.

Some examples of the method, apparatuses, and non-transitory computer-readable medium described herein may further include operations, features, means, or instructions for receiving a medium access control-control element (MAC-CE) including an indication of a highest Doppler frequency and a lowest Doppler frequency, where the highest Doppler frequency and the lowest Doppler frequency may be within the range of Doppler frequencies.

In some examples of the method, apparatuses, and non-transitory computer-readable medium described herein, the range of Doppler frequencies may be divided into a set of multiple portions each corresponding to a respective quantized frequency and a quantity of the portions and a size of the portions may be based on the range of Doppler frequencies and the resolution associated with the range of Doppler frequencies.

In some examples of the method, apparatuses, and non-transitory computer-readable medium described herein, the report includes a channel state information (CSI) report and the configuration message may be included as part of a CSI report configuration message.

In some examples of the method, apparatuses, and non-transitory computer-readable medium described herein, the set of multiple reference signals includes a set of multiple CSI reference signals (CSI-RSs) or a set of multiple tracking reference signals (TRSs).

A method for wireless communications at a second network node is described. The method may include transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report, transmitting a set of multiple reference signals, and receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

An apparatus for wireless communications at a second network node is described. The apparatus may include memory, a transceiver, and at least one processor of the second network node, the at least one processor coupled with the memory and the transceiver. The at least one processor may be configured to cause the apparatus to transmit a configuration message for a report by a first network node of parameters for a temporal domain precoder, where the configuration message indicates one or more of a range of Doppler frequencies, a resolution associated with the range of Doppler frequencies, or a quantity of the parameters for the first network node to report, transmit a set of multiple reference signals, and receive, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

Another apparatus for wireless communications at a second network node is described. The apparatus may include means for transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report, means for transmitting a set of multiple reference signals, and means for receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

A non-transitory computer-readable medium storing code for wireless communications at a second network node is described. The code may include instructions executable by a processor to transmit a configuration message for a report by a first network node of parameters for a temporal domain precoder, where the configuration message indicates one or more of a range of Doppler frequencies, a resolution associated with the range of Doppler frequencies, or a quantity of the parameters for the first network node to report, transmit a set of multiple reference signals, and receive, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

In some examples of the method, apparatuses, and non-transitory computer-readable medium described herein, transmitting the set of multiple reference signals may include operations, features, means, or instructions for transmitting the set of multiple reference signals according to a periodicity and a quantity of reference signal occasions, where the quantity of reference signal occasions may be greater than one.

In some examples of the method, apparatuses, and non-transitory computer-readable medium described herein, the configuration message further includes an indication of the periodicity and the quantity of reference signal occasions.

In some examples of the method, apparatuses, and non-transitory computer-readable medium described herein, one or both of the periodicity and the quantity of reference signal occasions maps to at least one of the range of Doppler frequencies, the resolution within the range of Doppler frequencies, or a quantity of quantized frequencies within the range of Doppler frequencies and the configuration message indicates one or more of the range of Doppler frequencies, the resolution associated with the range of Doppler frequencies, or the quantity of the parameters for the first network node to report based on indicating one or both of the periodicity and the quantity of reference signal occasions.

In some examples of the method, apparatuses, and non-transitory computer-readable medium described herein, the corresponding DFT vectors each include a DFT basis representative of a quantized frequency of the one or more quantized frequencies.

In some examples of the method, apparatuses, and non-transitory computer-readable medium described herein, the report further includes a respective Doppler coefficient for each of the corresponding DFT vectors.

In some examples of the method, apparatuses, and non-transitory computer-readable medium described herein, the report further includes an indication of a highest Doppler frequency and a lowest Doppler frequency, the highest Doppler frequency and the lowest Doppler frequency may be within the range of Doppler frequencies.

Some examples of the method, apparatuses, and non-transitory computer-readable medium described herein may further include operations, features, means, or instructions for transmitting a MAC-CE including an indication of a highest Doppler frequency and a lowest Doppler frequency, where the highest Doppler frequency and the lowest Doppler frequency may be within the range of Doppler frequencies.

In some examples of the method, apparatuses, and non-transitory computer-readable medium described herein, the range of Doppler frequencies may be divided into a set of multiple portions each corresponding to a respective quantized frequency and a quantity of the portions and a size of the portions may be based on the range of Doppler frequencies and the resolution associated with the range of Doppler frequencies.

In some examples of the method, apparatuses, and non-transitory computer-readable medium described herein, the report includes a CSI report and the configuration message may be included as part of a CSI report configuration message.

In some examples of the method, apparatuses, and non-transitory computer-readable medium described herein, the set of multiple reference signals includes a set of multiple CSI-RSs or a set of multiple TRSs.

DETAILED DESCRIPTION

Figure 1:
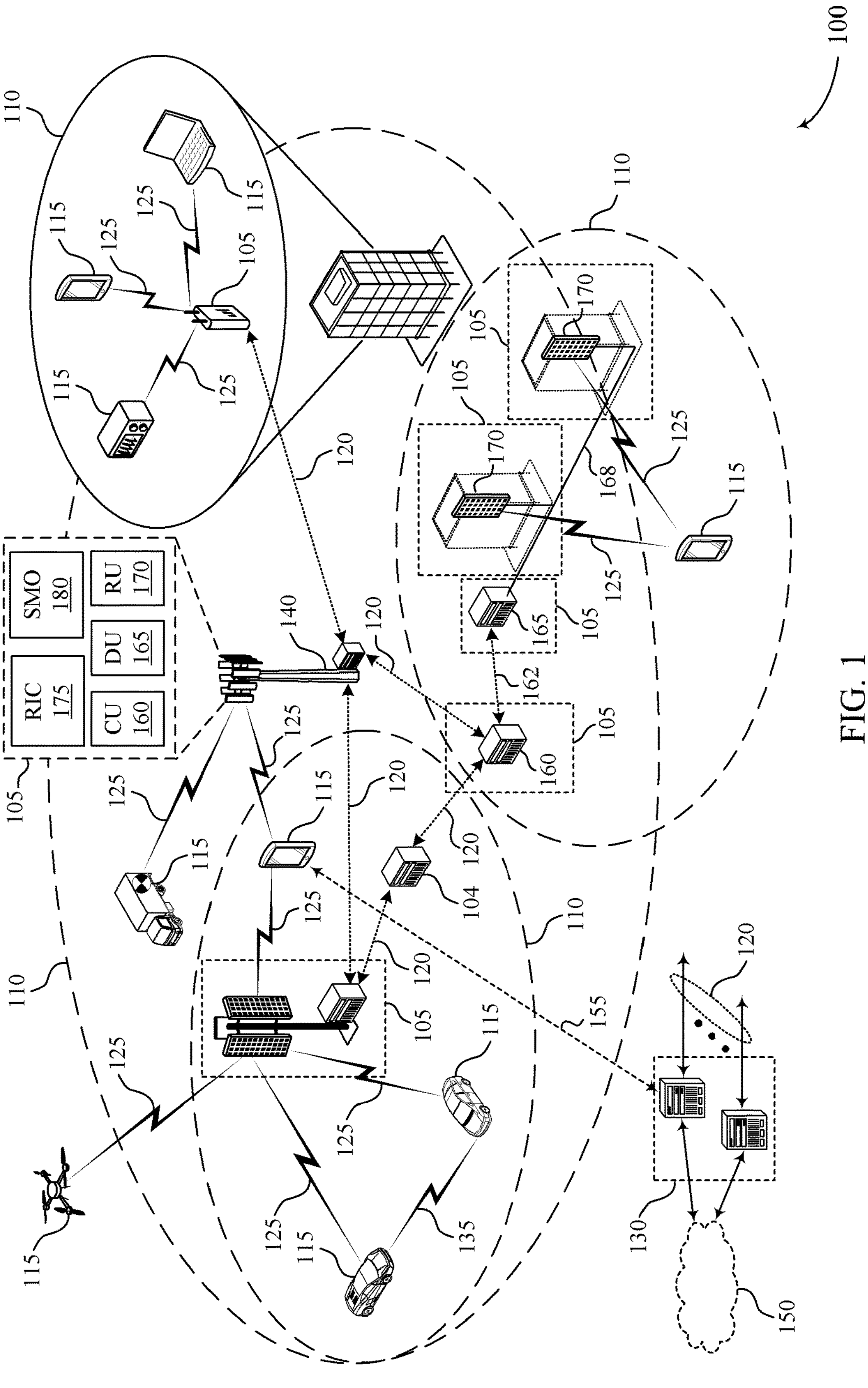
FIGS. 1 and 2 illustrate examples of a wireless communications system that supports temporal domain precoding configuration in accordance with one or more aspects of the present disclosure.

In some examples, a transmitting device (e.g., a base station) may transmit precoded signals. The transmitting device may perform a precoding operation in order to reduce the peak to average power ratio (PAPR) of a signal (e.g., a downlink signal). In some examples, the transmitting device may utilize information determined by a receiving device (e.g., a user equipment (UE)) to perform the precoding operation. For example, the receiving device may transmit a channel state information (CSI) report to the transmitting device including CSI (e.g., a precoding matrix indicator (PMI) and a rank indicator (RI)) and the transmitting device may utilize the CSI to perform the precoding operation. In some examples, the further reduce PAPR, the transmitting device may perform one or both of frequency domain compression or spatial domain compression during the precoding operation. In order to perform the frequency domain and the spatial domain compression, the UE may further report a frequency basis and a spatial basis to the base station. The frequency basis and the spatial basis may be examples of discrete Fourier transform (DFT) vectors that represent a frequency domain or a spatial domain that corresponds to a highest received signal strength.

In some examples, the base station may further reduce PAPR by performing Doppler frequency domain compression as part of the precoding. As described herein, the receiving device may be configured to report parameters for precoding in a temporal domain to the transmitting device. In some examples, the UE may receive a configuration message (e.g., a CSI report configuration message) indicating one or more of a Doppler range of frequencies, a resolution associated with the range of Doppler frequencies, and a quantity of parameters to include in a report. Upon receiving the configuration message, the UE may determine measurements of a received set of reference signals and, based on the measurements, select at least one bin within the range of Doppler frequencies. A bin, which may alternatively be referred to as a frequency bin, may refer to a portion (e.g., subset) of the range of Doppler frequencies. In some cases, a bin may be denoted by the midpoint of the bin—for example, a bin that spans from 15 Hz to 25 Hz may be referred to as the 20 Hz bin since the bin is centered at 20 Hz, and a bin that spans from −5 Hz to 5 Hz may be referred to as the 0 Hz bin since the bin is centered at 0 Hz, and so on. A bin may also be referred to as a quantized frequency.

In some examples, the UE may determine a Doppler frequency of the received reference signals that results in a highest received signal strength and select the bin based on the determined Doppler frequency being included in the bin. The receiving device may utilize the selected bin to determine a Doppler basis and transmit the Doppler basis in a report (e.g., CSI report) to the transmitting device. Similar to the spatial basis and the frequency basis, the Doppler basis may represent a Doppler frequency domain that corresponds to a highest received signal strength. Using the techniques may allow the transmitting device to perform Doppler frequency domain compression which may further reduce PAPR of the signal (e.g., the downlink signal).

Aspects of the disclosure are initially described in the context of wireless communications systems. Additional aspects are described in the context of a Doppler domain compression scheme and a process flow. Aspects of the disclosure are further illustrated by and described with reference to apparatus diagrams, system diagrams, and flowcharts that relate to temporal domain precoding configuration.

FIG. 1 illustrates an example of a wireless communications system 100 that supports temporal domain precoding configuration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support temporal domain precoding configuration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

As described herein, the network entity 105 may configure the UE 115 to report parameters associated with precoding in a temporal domain to the network entity 105. In some examples, the UE 115 may receive a configuration message from the network entity 105 to report the parameters, where the configuration message may include one or more a range of Doppler frequencies, a resolution associated with the range of Doppler frequencies, and a quantity of the parameters. The UE 115 may estimate a channel (e.g., downlink channel between the UE 115 and the network entity 105) based on a received set of reference signals and select one or more Doppler frequency bins from among a set of Doppler frequency bins included in the range of Doppler frequencies. Using the selected Doppler bin, the UE 115 may determine a DFT vector and transmit an indication of the DFT vector to the network entity 105 in a report such that the network entity 105 may perform precoding in the temporal domain.

Figure 2:
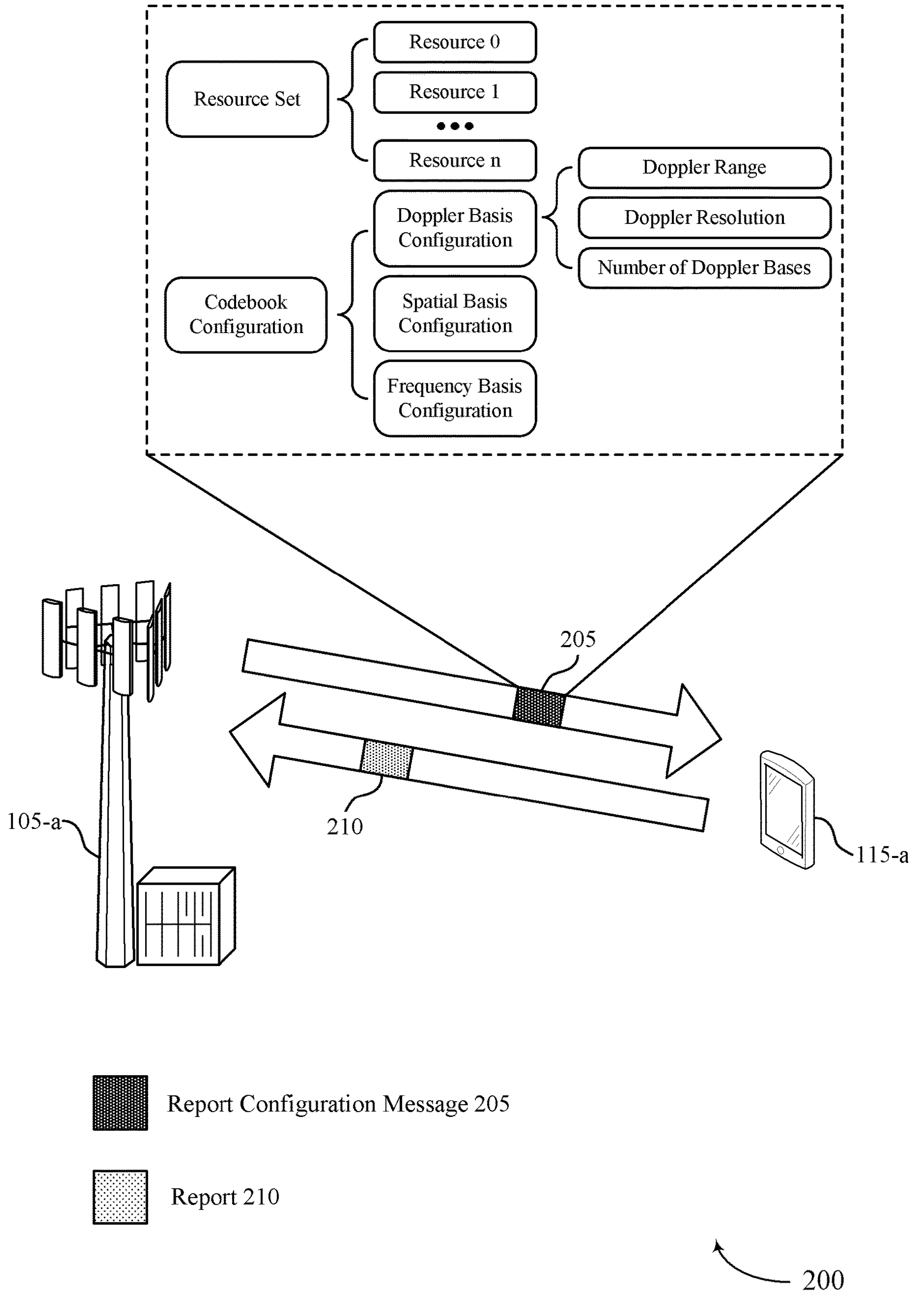

FIG. 2 illustrates an example of a wireless communications system 200 that supports temporal domain precoding configuration in accordance with one or more aspects of the present disclosure. In some examples, the wireless communications system 200 may implement aspects of a wireless communications system 100. For example, the wireless communications system 200 may include a UE 115-*a* and a base station 105-*a* which may be examples of a UE 115 and a network entity 105 as described with reference to FIG. 1.

In some examples, a transmitting device (e.g., a base station 105-*a*) may perform precoding to reduce PAPR of a transmitted signal (e.g., a downlink signal). Precoding may allow the transmitting device to exploit transmit diversity by weighing the information stream which may reduce the corrupted effects of a channel (e.g., a communications channel between the transmitting device and a receiving device). During precoding, the transmitting device may apply a precoder (e.g., one or more precoding matrices) to an estimation of the channel such that a vector including transmit symbols reaches the receiving device in the strongest form possible. In one example, the transmitting device may reduce the PAPR of the transmitted signal by performing frequency domain compression during precoding. In another example, the transmitting device may reduce the PAPR of the transmitted signal by performing spatial domain compression during precoding.

In some examples, the transmitting device may determine the precoder to use during precoding based on information indicative of the channel (e.g., CSI) obtained from the receiving device (e.g., the UE 115-*a*). In one example, the base station 105-*a* may transmit reference signals to the UE 115-*a*. The UE 115-*a* may measure the received reference signals and utilize the measurements (e.g., reference signal received power (RSRP)) of the received reference signals to determine the information indicative of the channel. The UE 115-*a* may then transmit the information indicative of the channel in a report 210. In some examples, the report 210 may be an example of a CSI report. In such example, the base station 105-*a* may transmit one or more CSI-RSs or tracking reference signals (TRSs) to the UE 115-*a* and the UE 115-*a* may perform measurements on the one or more CSI-RSs or TRSs. Using the measurements, the UE 115-*a* may determine one or more of an RI, a PMI, a channel quality indicator (CQI), or a CSI-RS resource indicator (CRI) and include the RI, the PMI, the CQI, or the CRI in the CSI report. In some examples, the base station 105-*a* may utilize the PMI to determine a precoding matrix for precoding.

In some examples, the UE 115-*a* may additionally determine a frequency domain basis and a spatial domain basis based on the measurements of the received reference signals. The frequency domain basis may represent a frequency range that results in a strongest reception of the reference signals (e.g., signal strength above a threshold) and the spatial domain basis may reflect layer (e.g., MIMO layer) and port combinations that result in a strongest reception of the reference signals (e.g., signal strength above a threshold). Moreover, the frequency domain basis and the spatial domain basis may be examples of DFT vectors. In some examples, the UE 115-*a* may transmit an indication of the spatial domain basis and the frequency domain basis to the base station 105-*a* in the report 210.

In some examples, prior to receiving the report 210, the UE 115-*a* may receive a report configuration message 205. The report configuration message 205 may include information related to the report 210. For example, the report configuration message 205 may include an indication of a periodicity at which to transmit the report 210 to the base station 105-*a*, an indication of which resources or resource sets on which to receive the reference signals, or an indication of what information to include in the report 210. In the case that the report 210 includes CSI report, the report configuration message 205 may be an example of a CSI report configuration message and may include one or more CSI-RS resource set IDs and a codebook configuration. The codebook configuration may further include a spatial basis configuration and a frequency basis configuration. The spatial basis configuration may include parameters that the UE 115-*a* may use when determining the spatial domain basis. Similarly, the frequency basis configuration may include parameters that the UE 115-*a* may use when determining the frequency domain basis.

Upon receiving the report 210, the base station 105-*a* may determine the precoder to use when performing precoding. In addition, the base station 105-*a* may perform channel estimation. That is, the base station 105-*a* may determine a channel matrix indicative of the characteristics of the channel. In some examples, using the frequency domain basis, the base station 105-*a* may determine a precoding matrix to apply during precoding for frequency domain compression. Additionally, in some examples, using the spatial domain basis, the base station 105-*a* may determine a precoding matrix to apply during precoding for spatial domain compression. In some examples, the precoder determined by the base station 105-*a* may be a combination of different precoding matrices (e.g., factorized precoder). For example, the precoder may be a combination of one or more of the precoding matrix indicated by the PMI, the precoding matrix for frequency domain compression, or the precoding matrix for spatial domain compression. The base station 105-*a* may apply the precoder to the estimated channel in an effort to reduce the PAPR of the transmitted signal. However, the precoder may only consider frequency domain compression and spatial domain compression when performing the precoding and may not consider temporal or Doppler domain compression when preforming the precoding. As such, the Doppler spectrum (e.g., Doppler frequency range) seen at the transmitting device may be relatively large which may increase the PAPR of the transmitted signal.

A Doppler effect may be described as a shift or change in a Doppler frequency (e.g., phase) of a wave due to the relative movement of the receiver with respect to the transmitter. In one example, the base station 105-*a* may transmit a signal to the UE 115-*a*. If the UE 115-*a* is moving (e.g., either away or toward the base station 105-*a*), the Doppler frequency of the signal may change as a result of the Doppler effect. As such, the Doppler frequency of the signal may fluctuate. However, each Doppler frequency that the signal exhibit may not be associated with a same signal strength. That is, the signal at a first Doppler frequency may be associated with a greater amplitude than an amplitude associated with the signal at a second Doppler frequency. Doppler frequencies that are associated with signal strength values that are below a threshold may not be useful and may unnecessary increase the PAPR of the signal. As such, it may be beneficial for the precoder to consider a range of Doppler frequencies that are associated with signal strength values that are above a threshold (e.g., perform temporal domain compression) such that PAPR reduction is maximized.

As described herein, the base station 105-*a* may preform temporal or Doppler domain compression during precoding. As described above, the base station 105-*a* may transmit a report configuration message 205 to the UE 115-*a*. In some examples, the report configuration message 205 may be a CSI report configuration message and include the codebook configuration. In addition to the spatial basis configuration and the frequency basis configuration, the codebook configuration may further include a Doppler basis configuration. The Doppler basis configuration may include parameters for determining the Doppler domain basis. Similar to the spatial domain basis and the frequency domain basis, the Doppler domain basis may represent a Doppler frequency range that results in the strongest reception of the reference signals. In some examples, the one or more parameters included in the Doppler basis configuration may be a range of Doppler frequencies, a resolution associated with the range of Doppler frequencies, or a quantity of Doppler bases to report per beam or power delay profile (PDP) profile.

Upon receiving the report configuration message 205, the UE 115-*a* may divide the range of Doppler frequencies into one or more bins or quantized frequencies (e.g., portions of Doppler frequency) based on the parameters included in the report configuration message 205. As one example, the range of Doppler frequencies may be from −40 Hz to 40 Hz and the resolution associated with the range of Doppler frequencies may be equal to 10 Hz. In such example, the UE 115-*a* may identify 9 bins or quantized frequencies (e.g., −40 Hz, −30 Hz, −20 Hz, −10 Hz, 0 Hz, 10 Hz, 20 Hz, 30 Hz, 40 Hz) where each bin size is 10 Hz. Sometime after receiving the report configuration message 205, the UE 115-*a* may receive one or more reference signals from the base station 105-*a*. In the case of CSI reporting, the reference signals may be CSI-RSs or TRSs. In some examples, the UE 115-*a* may receive the reference signals using a set of directional beams. Additionally or alternatively, the reference signals may be received using a set of PDP profiles. In some examples, the UE 115-*a* may receive the reference signals according to a periodicity and a number (quantity) of occasions. That is, the UE 115-*a* may determine measurements of bundled reference signals. In one example, the periodicity may be equal to 4 ms and the number of occasions may be equal to 4. In such example, the resource set (e.g., CSI-RS resource set or TRS resource set) indicated in the report configuration message 205 may repeat every 4 times every 4 ms. In some examples, the periodicity of the reference signals and the number of occasions for the resource set may be indicated in the report configuration message 205.

Upon receiving the reference signals, the UE 115-*a* may determine measurements of the reference signals. In one example, the UE 115-*a* may determine a signal strength (e.g., RSRP) of the received reference signals for each beam or PDP of the set. Once the UE determines the measurements, the UE 115-*a* may select a Doppler frequency for each beam or PDP that corresponds to a highest signal strength. The UE 115-*a* may compare the selected Doppler frequency to the one or more bins associated with the Doppler range of frequencies and determine that the Doppler frequency is included in a bin (e.g., included in the portion of Doppler frequency associated with the bin) of the one or more bins. Using the bin, the UE 115-*a* may determine the Doppler domain basis for the respective beam or PDP. The UE 115-*a* may additionally determine one or more corresponding Doppler coefficients for each beam or PDP. In some examples, the UE 115-*a* may select more than one Doppler frequency (e.g., 2 Doppler frequencies) for each beam or PDP. As one example, the UE may select 2 Doppler frequencies for each beam of PDP. In such example, the 2 Doppler frequencies may be associated with the two highest received signal strengths. Additionally, the UE 115-*a* may select 2 bins from the one or more bins for each beam or PDP based on the determined 2 Doppler frequencies and determine 2 Doppler bases for a beam or PDP. The UE 115-*a* may than include the 2 Doppler bases in the report 210. In some examples, the number (quantity) of Doppler basis determined for each beam or PDP is based on the indication of the quantity of Doppler bases included in the report configuration message 205. That is, the UE 115-*a* may select more than one Doppler frequency if the number of Doppler basis indicated in the report configuration message 205 is greater than 1.

After determining the Doppler bases, the UE 115-*a* may transmit the report 210 including the one or more Doppler bases to the base station 105-*a*. In addition to the one or more Doppler bases, the report 210 may include corresponding Doppler coefficients. Upon receiving the report 210, the base station 105-*a* may utilize at least the one or more Doppler domain bases to determine a precoding matrix for Doppler domain compression and apply the precoding matrix to the estimated channel during precoding.

Figure 3:
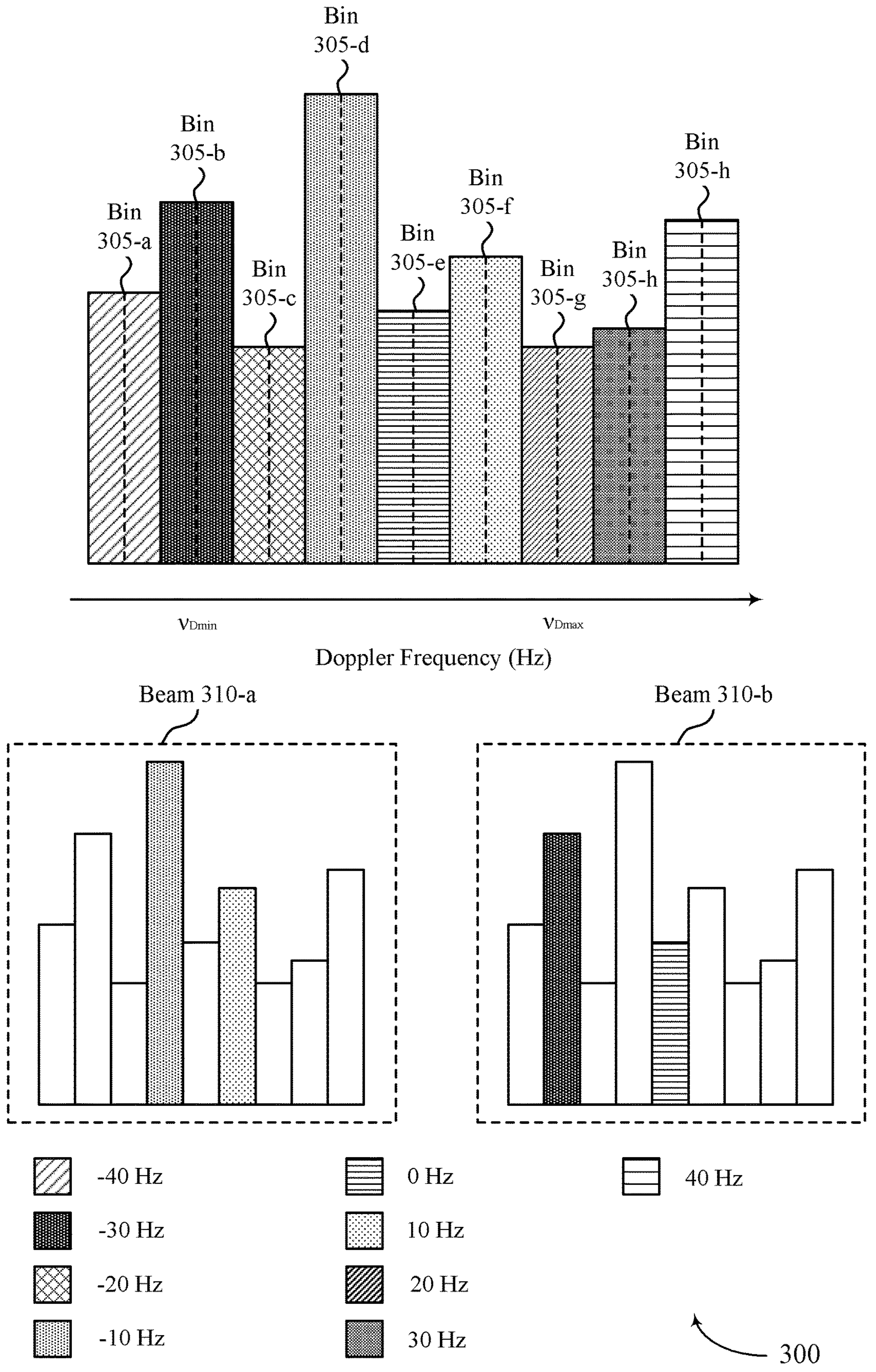
FIG. 3 illustrates an example of a Doppler domain compression scheme that supports temporal domain precoding configuration in accordance with one or more aspects of the present disclosure.

FIG. 3 illustrates an example of a Doppler domain compression scheme 300 that supports temporal domain precoding configuration in accordance with one or more aspects of the present disclosure. In some examples, the Doppler domain compression scheme 300 may be implemented by aspects of a wireless communications system 100 and a wireless communications system 200. For example, the Doppler domain compression scheme 300 may be implemented by a network entity 105, a base station 105, and a UE 115 as described with reference to FIGS. 1 and 2.

As described above, a receiving device (e.g., a UE) may report a Doppler basis to a transmitting device (e.g., a base station) such that the transmitting device may compress a Doppler spectrum of precoding matrices used during precoding to further reduce PAPR. Prior to determining the Doppler basis, the UE may receive a configuration message. In some examples, the configuration message may include a Doppler basis configuration. The Doppler basis configuration may include parameters such as one or more of an indication of a range of Doppler frequencies, an indication of a resolution associated with the range of Doppler frequencies, or an indication of a number of Doppler bases to report per beam, beam group, per layer (e.g., per MIMO layer), per PDP, or any combination thereof.

As shown in Table 1, the parameter $D_1$ may indicate the range of Doppler frequencies. In some examples, different values of $D_1$ may indicate different ranges. For example, a $D_1$ value of 0 may indicate a range of −40 to 40 Hz, a $D_1$ value of 1 may indicate a range of −80 to 80 Hz, a $D_1$ value of 2 may indicate a range of −100 to 100 Hz, and a $D_1$ value of 3 may indicate a range of −120 to 120 Hz.

TABLE 1

| $D_1$ | Range |
| --- | --- |
| 0 | −40 to 40 Hz |
| 1 | −80 to 80 Hz |
| 2 | −100 to 100 Hz |
| 3 | −120 to 120 Hz |

Further, as shown in Table 2, the parameter $D_2$ may indicate the resolution associated with the range of Doppler frequencies. In some examples, different values of $D_2$ may indicate different resolutions. For example, a $D_2$ value of 0 may indicate a resolution of 10 Hz, a $D_2$ value of 1 may indicate a resolution of 20 Hz, a $D_2$ value of 2 may indicate a resolution of 30 Hz, and a $D_2$ value of 3 may indicate a resolution of 40 Hz.

TABLE 2

| $D_1$ | Resolution |
| --- | --- |
| 0 | 10 Hz |
| 1 | 20 Hz |
| 2 | 30 Hz |
| 3 | 40 Hz |

Moreover, as shown in Table 3, the parameter $D_3$ may indicate the number of Doppler bases to report. In some examples, different values of $D_3$ may indicate different numbers of Doppler bases. For example, a $D_3$ value of 0 may indicate 1 Doppler basis, a $D_3$ value of 1 may indicate 2 Doppler bases, a $D_3$ value of 2 may indicate 3 Doppler bases, and a $D_3$ value of 3 may indicate 4 Doppler bases.

TABLE 3

| $D_1$ | Number of Doppler Bases |
| --- | --- |
| 0 | 1 |
| 1 | 2 |
| 2 | 3 |
| 3 | 4 |

In some examples, the receiver (e.g., the UE) may receive control signaling indicating a mapping between each parameter value (e.g., 0, 1, 2, and 3) and the corresponding Doppler frequency range, Doppler frequency resolution, or number of Doppler bases to report. Upon receiving the value of $D_1$, $D_2$, or $D_3$ in the configuration message, the receiver may utilize the mapping to determine the range, the resolution, and the number of Doppler bases to report.

In another example, the one or more parameters may not be explicitly indicated to the receiver via the configuration message. Instead, the one or more parameters may be implicitly indicated by a bundled reference signal configuration (e.g., CSI-RS configuration) included in the configuration message. In such example, the receiver may receive control signaling indicating a mapping between parameters associated with reference signals and the one or more parameters (e.g., the Doppler frequency range, the Doppler frequency resolution, or the number of Doppler bases to report). The parameters associated with the reference signals may include one or both of a periodicity for the reference signals or a number of occasions for the reference signals. Table 4 illustrates an example of the mapping. As shown in Table 4, the mapping may indicate a relationship between a periodicity of 4 ms and 4 occasions and a $D_1$, $D_2$, and $D_3$ value of 1, 1, and 0, respectively. Upon receiving the value of the periodicity and the number of occasions in the configuration message, the receiver may utilize the mapping to determine the values of $D_1$, $D_2$, and $D_3$. Alternatively, the receiver may determine $D_1$, $D_2$, and $D_3$ as a function of periodicity and the number of occasions.

TABLE 4

| (Periodicity, Occasions) | ($D_1$, $D_2$, $D_3$) |
| --- | --- |
| 4 ms, 4 | (1, 1, 0) and (1, 1, 1) |
| 4 ms, 8 | (2, 0, 0) and (2, 0, 1) |
| 8 ms, 4 | (0, 1, 0) and (0, 1, 1) |
| 8 ms, 8 | (1, 0, 0) and (1, 0, 1) |

In the example of FIG. 3, the receiver may determine or identify a $D_1$ value of 0, a $D_2$ value of 0, and a $D_3$ value of 1. As indicated in the Tables 1, 2, and 3, $D_1$ value of 0, a $D_2$ value of 0, and a $D_3$ value of 1 may result in a range of −40 Hz to 40 Hz, a resolution of 10 Hz, and 2 Doppler bases to report. As such, upon receiving the configuration message, the receiver may identify 9 bins (e.g., −40 Hz, −30 Hz, −20 Hz, −10 Hz, 0 Hz, 10 Hz, 20 Hz, 30 Hz, and 40 Hz), where each bin 305 is separated by 10 Hz. In some examples, after determining the one or more parameters (e.g., the range, the resolution, and the number of Doppler bases), the receiver may determine a maximum Doppler frequency (e.g., $v_{Dmax}$) and a minimum Doppler frequency (e.g., $v_{Dmin}$). The maximum Doppler frequency and the minimum Doppler frequency may represent a second range of Doppler frequencies that is different from the range of Doppler indicated by $D_1$. For example, the second range may be smaller than the range indicated by $D_1$, but may be included in the range indicated by $D_1$. As one example, the receiver may determine a maximum Doppler frequency of 20 Hz and a minimum Doppler frequency of −30 Hz resulting in a second range of −30 Hz to 20 Hz. The receiver may apply the second range to all beams or all PDPs (e.g., utilize the second range for bin selection and subsequent Doppler basis determination).

In one example, to determine the second range, the receiver may measure the Doppler frequencies of reference signals received using one or more directional beams and compare a highest measured Doppler frequency and a lowest measured Doppler frequency of the measured Doppler frequencies to the bins 305 to determine the maximum Doppler frequency and the minimum Doppler frequency (e.g., the second range). As one example, the UE may determine that the highest measured Doppler frequency is 22 Hz and the lowest measured Doppler frequency is −29 Hz. The Doppler frequency of 22 Hz is included in bin 305-*c* (e.g., 20 Hz bin) and the Doppler frequency −29 is included in the bin 305-*b* (e.g., −30 Hz bin). As such, the receiver may determine that the maximum Doppler frequency is 20 Hz and the minimum Doppler frequency is −30 Hz. Using such techniques to determine the second range may allow the receiver to utilize a range that is more accurate than the range indicated by $D_1$ and potentially report Doppler basis using less bits. In some examples, the receiver may include an indication of the maximum Doppler frequency and the minimum Doppler frequency in a report (e.g., a CSI report). If $D_1$ equals 0 and $D_2$ equals 0, there may be 9 hypotheses for the maximum Doppler frequency and the minimum Doppler frequency. As such, the receiver may indicate one or both of the maximum Doppler frequency and the minimum Doppler frequency using 4 bits.

In another example, to determine the second range, the receiver may receive control signaling (e.g., a MAC-control element (MAC-CE)) from the transmitter indicating the maximum Doppler frequency and the minimum Doppler frequency. Using such technique may allow the transmitter to adjust the range to a different range of value than the range values configured for the different $D_1$ values (e.g., shown in Table 1). In another example, the receiver may not determine a second range. In such example, the receiver may apply the range indicated by $D_1$ to all beams or all PDP (e.g., utilize the range for bin selection and subsequent Doppler basis determination). That is, the maximum Doppler frequency may be equal to highest Doppler frequency of the range indicated by $D_1$ and the minimum Doppler frequency may be lowest Doppler frequency of the range indicated by $D_1$. For example, in FIG. 3, the minimum Doppler frequency may be −40 Hz and the maximum Doppler frequency may be 40 Hz.

As described in FIG. 2, after receiving the configuration message, the receiver may receive reference signals from the transmitter using one or more directional beams 310. In the example of FIG. 3, the receiver may receive the one or more reference signals using a directional beam 310-*a* and one or more reference signals using a directional beam 310-*b*, where the directional beam 310-*a* is different from the directional beam 310-*b*. The receiver may determine first measurements of the received reference signals using the directional beam 310-*a* and determine second measurements of the receiver reference signals using the directional beam 310-*b*. From the first measurements, the receiver may determine one or more Doppler frequencies that result in a highest signal strength and similarly, from the second measurements, the receiver may determine one or more maximum Doppler frequencies that result in the highest signal strength. In the example of FIG. 2, the receiver may determine 2 Doppler frequencies for each beam 310 (e.g., if $D_3$ is equal to 1). As one example, the receiver may determine that the 2 Doppler frequencies that result in the highest signal strength for beam 310-*a* are −7 Hz and 11 Hz. As such, the receiver may select the −10 Hz bin and the 10 Hz bin. For the beam 310-*b*, the receiver may determine that the 2 Doppler frequencies that result in the highest signal strength are −32 Hz and 2 Hz. As such, the receiver may select the −30 Hz bin and the 0 Hz bin. In some examples, the receiver may transmit an indication of the bins for each beam in a report (e.g., the CSI report). If the receiver is utilizing the range indicated by $D_1$ (e.g., −40 to 40), the receiver may indicate 1 bin per beam using 4 bits or 2 bins per beam using 7 bit. If the receiver is utilizing the second range (e.g., −30 to 20), the receiver may indicate 1 bin per beam using 3 bits and 2 bins per beam using 5 bits.

Additionally or alternatively, the receiver may determine one or more Doppler bases for each directional beam using the selected bins. For example, in the example of FIG. 3, the receiver may determine a first Doppler basis for beam 310-*a* using the −10 Hz bin, a second Doppler basis for beam 310-*a* using the 10 Hz bin, a third Doppler basis for beam 310-*b* using the −30 Hz bin, and a fourth Doppler basis for beam 310-*b* using the 0 Hz bin. Once the receiver determines the Doppler basis, the receiver may transmit an indication of the Doppler basis to the transmitter. In some examples, the indication of the Doppler bases may be included in a report. In the case that the indication of the Doppler bases are included in the CSI report, the Doppler bases may be reported as a separate reporting quantity in the CSI report. As such, a reporting periodicity and triggering event for Doppler basis reporting may be separate from a CSI reporting periodicity. For example, a CSI report may be reported in every subframe, but the Doppler basis portion of the CSI report may be reporting every other subframe.

Figure 4:
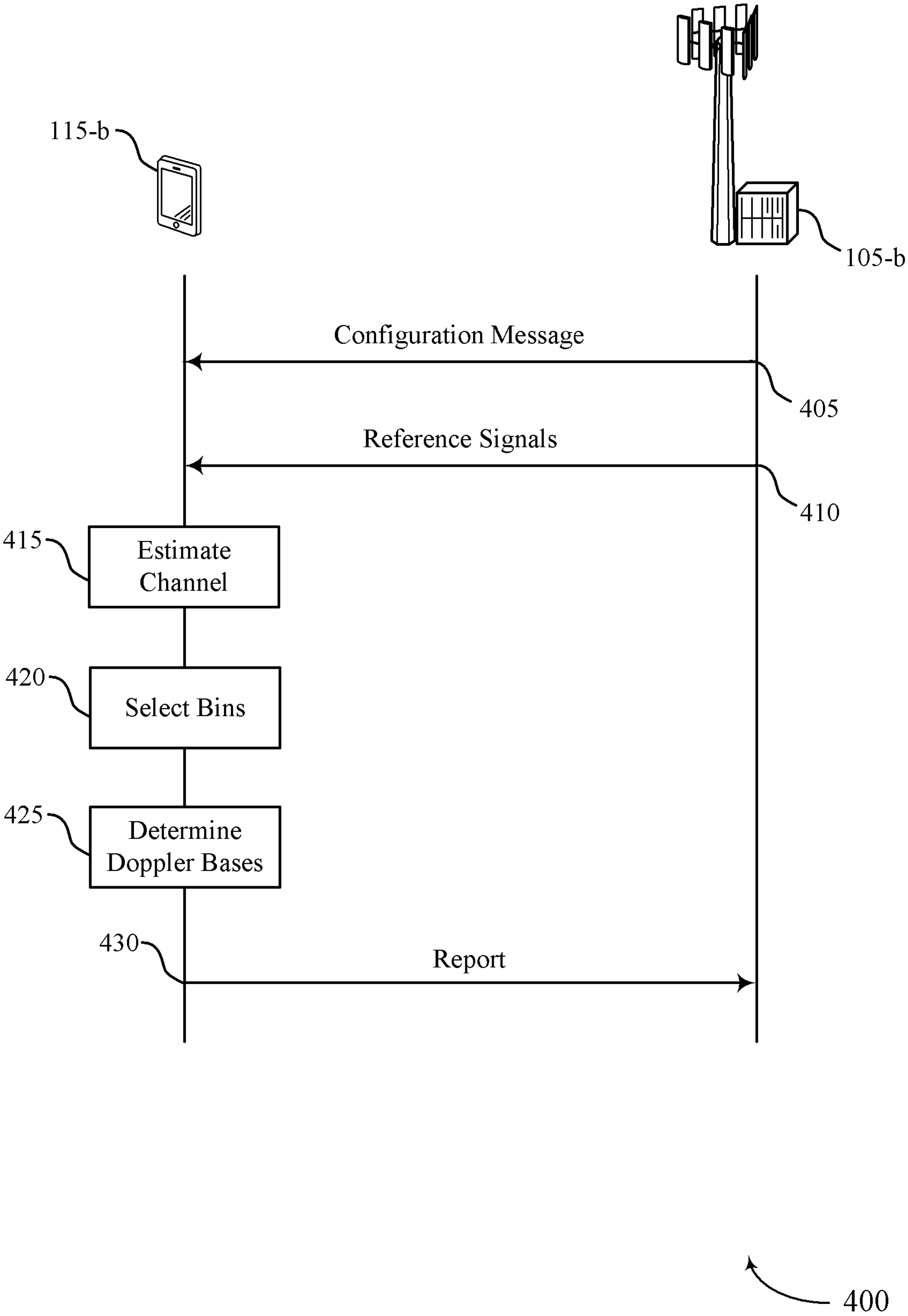
FIG. 4 illustrates an example of a process flow that supports temporal domain precoding configuration in accordance with one or more aspects of the present disclosure.

FIG. 4 illustrates an example of a process flow 400 that supports temporal domain precoding configuration in accordance with one or more aspects of the present disclosure. In some examples, the process flow 400 may be implemented by aspects of a wireless communications system 100 and a wireless communications system 200. For example, the process flow 400 may be implemented by a base station 105-*b* and a UE 115-*b* which may be examples of a network entity 105, a base station 105, and a UE 115 as described with reference to FIGS. 1 and 2.

At 405, the UE 115-*b* may receive a configuration message from the base station 105-*b*. In some examples, the configuration message is for a report by the UE 115-*b* of parameters for precoding in a temporal domain. The configuration message may indicate one or more of a range of Doppler frequencies, a resolution associated with the range of Doppler frequencies, or a quantity of the parameters for precoding in the temporal domain to report. In some examples, the configuration message may be an example of a CSI configuration message.

At 410, the UE 115-*b* may receive a set of reference signals from the base station 105-*b*. In some examples, the UE 115-*b* may receive the set of reference signals using a set of directional beams or a set of PDPs. In some examples, the UE 115-*b* may receive the set of reference signals according to a periodicity and a quantity of reference signal occasions. The quantity of reference signal occasions may be greater than one. The periodicity and the quantity of reference signal occasion may be indicated via the configuration message received at 405. In some examples, the set of reference signals may be an example of a set of CSI-RSs or TRSs.

In some example, the UE 115-*b* may receive control signaling indicating a mapping between different combinations of the periodicity and the quantity of reference signal occasions and different values of one or more of the range of Doppler frequencies, the resolution associated with the range of Doppler frequencies, or the quantity of parameters to report. The UE 115-*b* may receive an indication of the mapping in the configuration message received at 405. In such example, the UE 115-*b* may not receive the indication of one or more of the range of Doppler frequencies, the resolution associated with the range of Doppler frequencies, or the quantity of the parameters to report, but rather the UE 115-*b* may implicitly determine the range of Doppler frequencies, the resolution associated with the range of Doppler frequencies, or the quantity of the parameters to report using the periodicity and the number of reference signal occasion indicated in the configuration message and the mapping indicated in the control signaling.

At 415, the UE 115-*b* may estimate the communication channel between the UE 115-*b* and the base station 105-*b*. To estimate the channel, the UE 115-*b* may determine measurements (e.g., RSRP measurements) of the one or more received reference signals. In some examples, the UE 115-*b* may bundle reference signals received over more than one occasion. That is, the UE 115-*b* may combine measurements of reference signals received over more than one occasion. In some examples, the UE 115-*b* may determine, for each beam or PDP profile, one or more Doppler frequency values that correspond to a signal strength that is above a threshold.

At 420, the UE 115-*b* may select at least one bin for each beam or PDP profile. In some examples, the range of Doppler frequencies may be divided into different bins. In one example, the range of Doppler frequencies may be equal to −40 Hz to 40 Hz and the resolution associated with range of Doppler frequencies may be equal to 10 Hz. In such example, the bins may be −40 Hz, −30 Hz, −20 Hz, −10 Hz, 0 Hz, 10 Hz, 20 Hz, 30 Hz, 40 Hz and each bin may span 10 Hz. For example, the −40 Hz bin may span 45 Hz to 35 Hz. The UE 115-*b* may compare the Doppler frequencies determined at 415 to the bins. If a Doppler frequency of a directional beam or a PDP falls within a range of a bin, the UE 115-*b* may select the bin for the directional beam or PDP.

At 425, the UE 115-*b* may determine a Doppler basis for each of the selected bins. In some examples, the UE 115-*b* may utilize the selected bins to determine the Doppler basis. The Doppler basis may be an example of a DFT vector that is representative of a Doppler frequency that corresponds to signal strength that satisfies a threshold.

At 430, the UE 115-*b* may transmit a report to the base station 105-*b*. The report may include the Doppler bases determined at 425. Additionally, the report may include Doppler coefficients corresponding to each of the Doppler bases. In some examples, the report may be an example of a CSI report.

Figure 5:
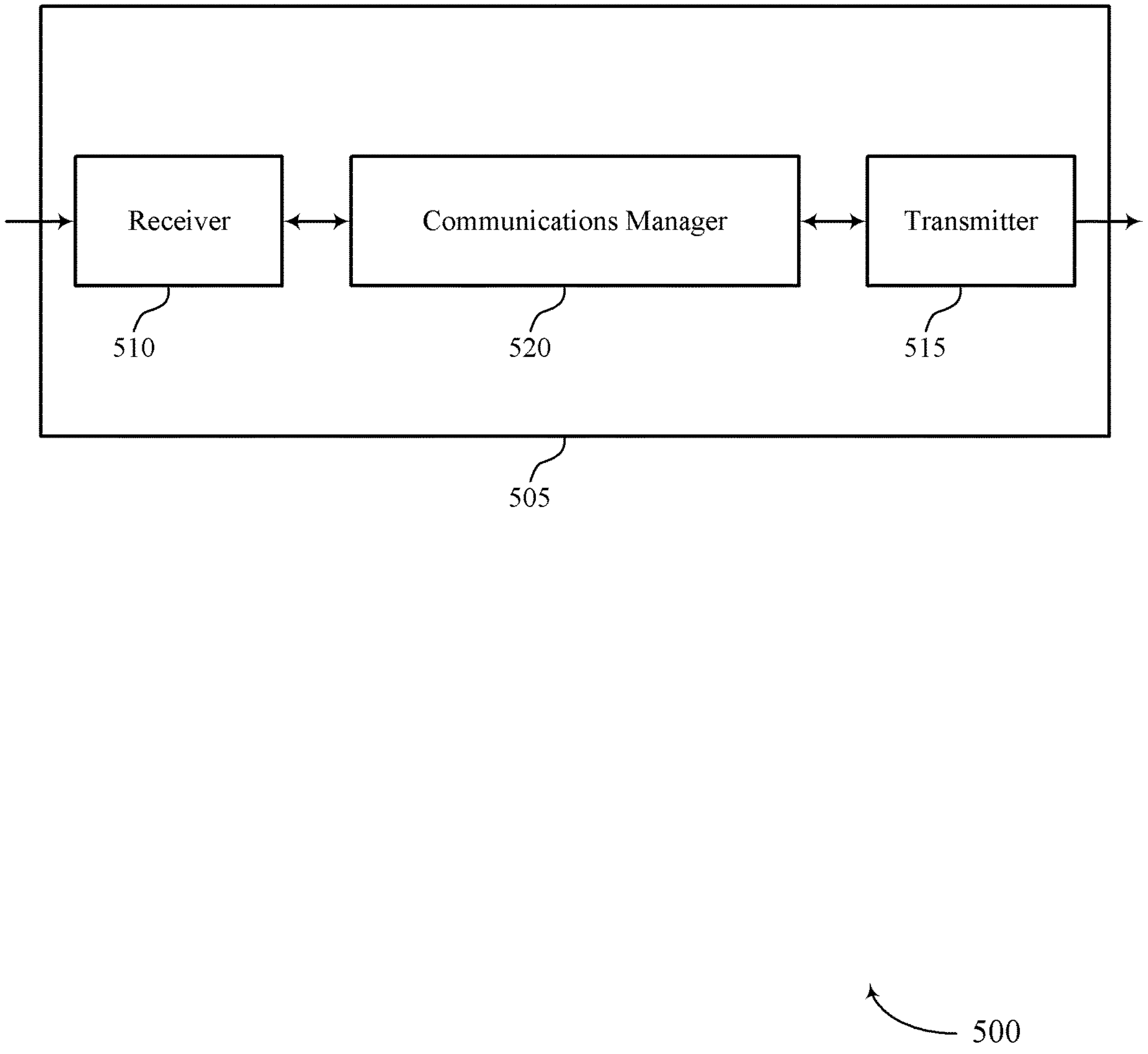
FIGS. 5 and 6 show block diagrams of devices that support temporal domain precoding configuration in accordance with one or more aspects of the present disclosure.

FIG. 5 shows a block diagram 500 of a device 505 that supports temporal domain precoding configuration in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to temporal domain precoding configuration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to temporal domain precoding configuration). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of temporal domain precoding configuration as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first network node in accordance with examples as disclosed herein. For example, the communications manager 520 may be configured as or otherwise support a means for receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report. The communications manager 520 may be configured as or otherwise support a means for estimating a communications channel between the first network node and a second network node based on receiving a set of multiple reference signals. The communications manager 520 may be configured as or otherwise support a means for selecting, based on the quantity of the parameters for the first network node to report and estimating the communications channel, one or more quantized frequencies within the range of Doppler frequencies. The communications manager 520 may be configured as or otherwise support a means for determining, for each selected quantized frequency within the range of Doppler frequencies, a corresponding DFT vector, where the parameters for the temporal domain precoder include the corresponding DFT vector for each selected quantized frequency within the range of Doppler frequencies. The communications manager 520 may be configured as or otherwise support a means for transmitting the report including the parameters for the temporal domain precoder.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing and reduced power consumption.

Figure 6:
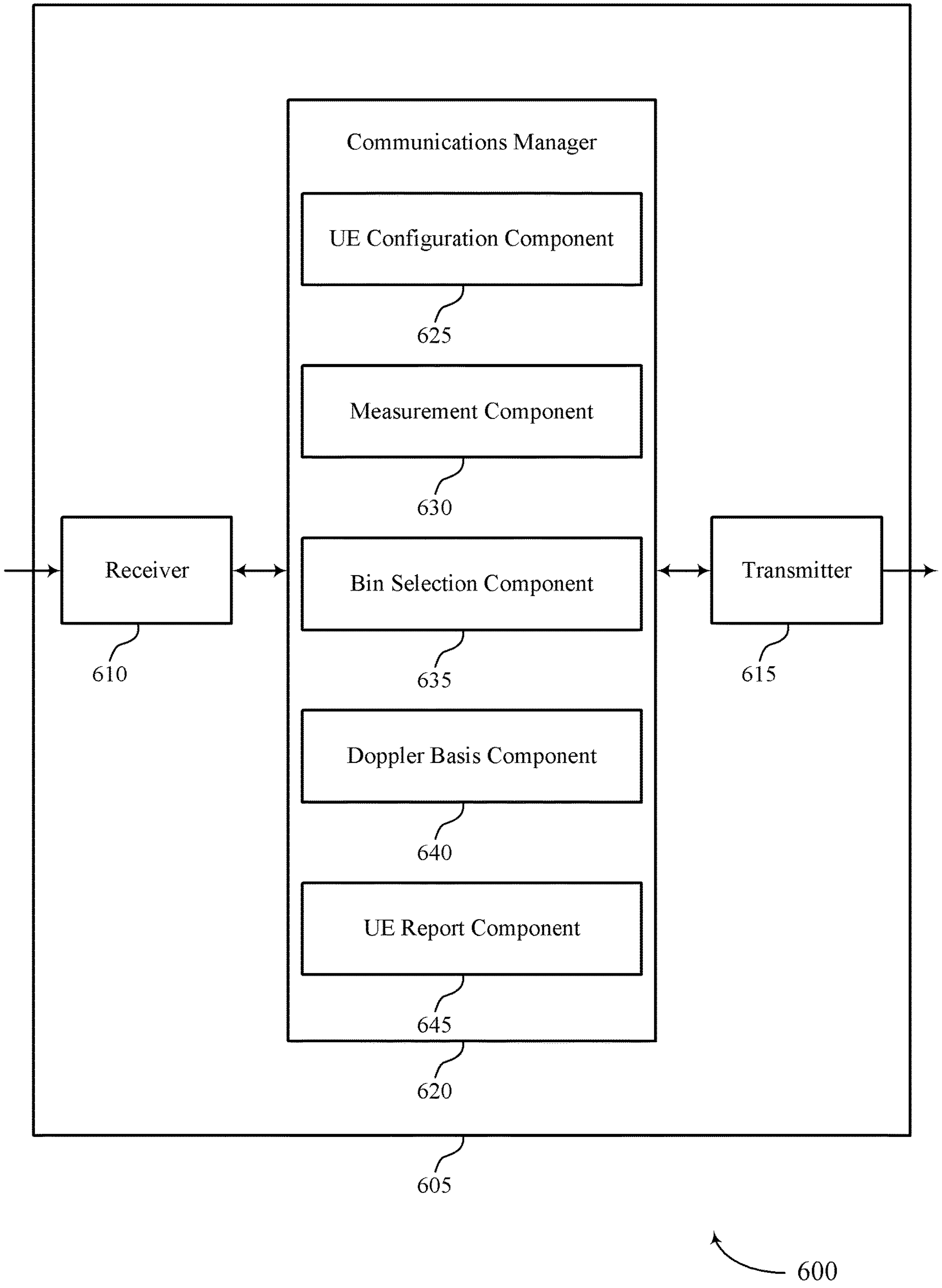

FIG. 6 shows a block diagram 600 of a device 605 that supports temporal domain precoding configuration in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to temporal domain precoding configuration). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to temporal domain precoding configuration). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of temporal domain precoding configuration as described herein. For example, the communications manager 620 may include a UE configuration component 625, a measurement component 630, a bin selection component 635, a Doppler basis component 640, a UE report component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first network node in accordance with examples as disclosed herein. The UE configuration component 625 may be configured as or otherwise support a means for receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report. The measurement component 630 may be configured as or otherwise support a means for estimating a communications channel between the first network node and a second network node based on receiving a set of multiple reference signals. The bin selection component 635 may be configured as or otherwise support a means for selecting, based on the quantity of the parameters for the first network node to report and estimating the communications channel, one or more quantized frequencies within the range of Doppler frequencies. The Doppler basis component 640 may be configured as or otherwise support a means for determining, for each selected quantized frequency within the range of Doppler frequencies, a corresponding DFT vector, where the parameters for the temporal domain precoder include the corresponding DFT vector for each selected quantized frequency within the range of Doppler frequencies. The UE report component 645 may be configured as or otherwise support a means for transmitting the report including the parameters for the temporal domain precoder.

Figure 7:
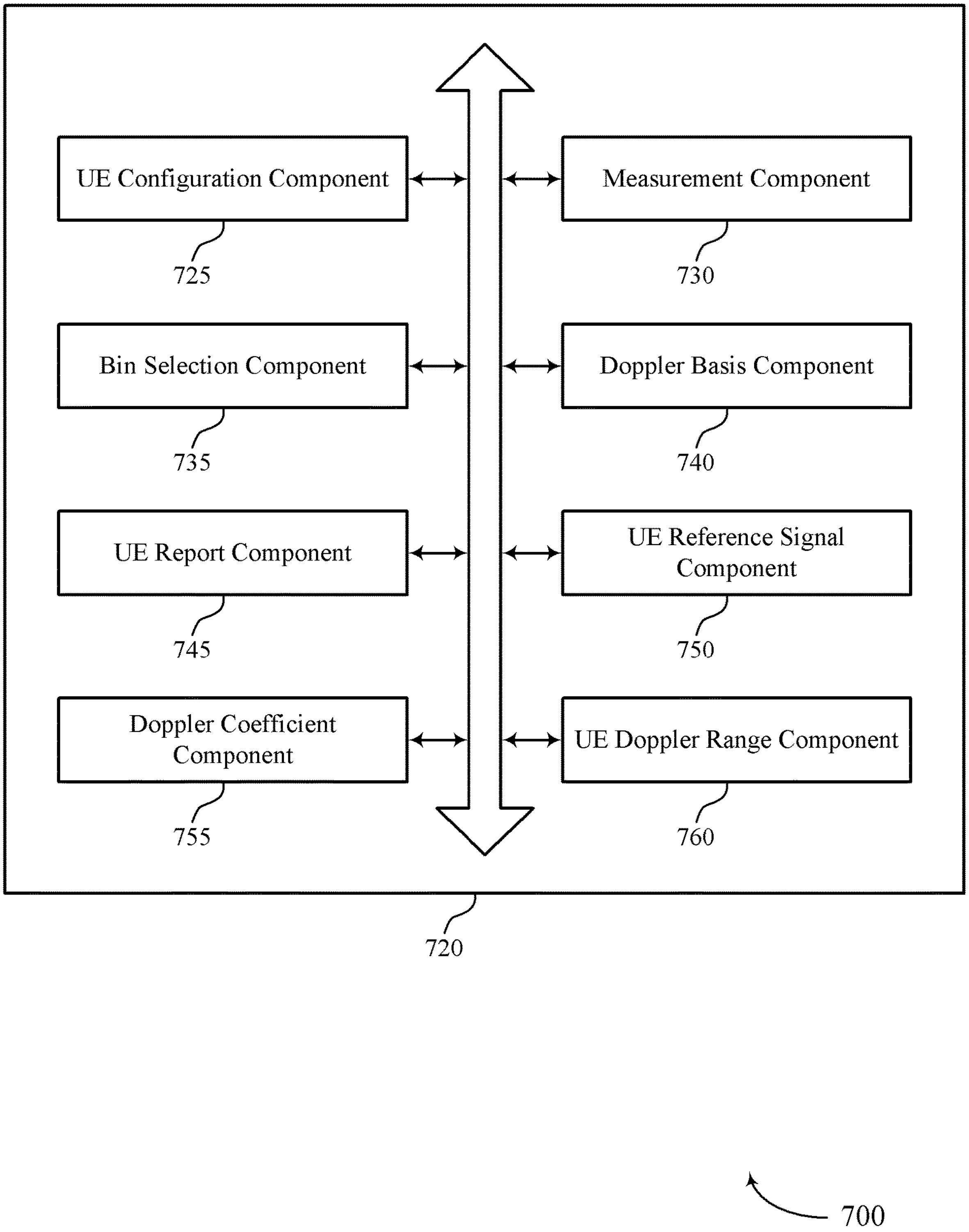
FIG. 7 shows a block diagram of a communications manager that supports temporal domain precoding configuration in accordance with one or more aspects of the present disclosure.

FIG. 7 shows a block diagram 700 of a communications manager 720 that supports temporal domain precoding configuration in accordance with one or more aspects of the present disclosure. The communications manager 720 may be an example of aspects of a communications manager 520, a communications manager 620, or both, as described herein. The communications manager 720, or various components thereof, may be an example of means for performing various aspects of temporal domain precoding configuration as described herein. For example, the communications manager 720 may include a UE configuration component 725, a measurement component 730, a bin selection component 735, a Doppler basis component 740, a UE report component 745, a UE reference signal component 750, a Doppler coefficient component 755, a UE Doppler range component 760, or any combination thereof. Each of these components may communicate, directly or indirectly, with one another (e.g., via one or more buses).

The communications manager 720 may support wireless communications at a first network node in accordance with examples as disclosed herein. The UE configuration component 725 may be configured as or otherwise support a means for receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report. The measurement component 730 may be configured as or otherwise support a means for estimating a communications channel between the first network node and a second network node based on receiving a set of multiple reference signals. The bin selection component 735 may be configured as or otherwise support a means for selecting, based on the quantity of the parameters for the first network node to report and estimating the communications channel, one or more quantized frequencies within the range of Doppler frequencies. The Doppler basis component 740 may be configured as or otherwise support a means for determining, for each selected quantized frequency within the range of Doppler frequencies, a corresponding DFT vector, where the parameters for the temporal domain precoder include the corresponding DFT vector for each selected quantized frequency within the range of Doppler frequencies. The UE report component 745 may be configured as or otherwise support a means for transmitting the report including the parameters for the temporal domain precoder.

In some examples, to support selecting the one or more quantized frequencies within the range of Doppler frequencies, the bin selection component 735 may be configured as or otherwise support a means for determining, for each directional beam of a set of directional beams or for each power delay profile of a set of power delay profiles, one or more Doppler frequencies that correspond to respective received power values that are above a threshold. In some examples, to support selecting the one or more quantized frequencies within the range of Doppler frequencies, the bin selection component 735 may be configured as or otherwise support a means for selecting, for each directional beam of the set or for each power delay profile of the set, the one or more quantized frequencies based at least on the one or more determined Doppler frequencies being within frequency ranges that include the one or more quantized frequencies.

In some examples, to support receiving the set of multiple reference signals, the UE reference signal component 750 may be configured as or otherwise support a means for receiving the set of multiple reference signals according to a periodicity and a quantity of reference signal occasions, where the quantity of reference signal occasions is greater than one.

In some examples, the UE reference signal component 750 may be configured as or otherwise support a means for bundling the set of multiple reference signals, where estimating the communications channel is based on the bundling.

In some examples, the configuration message further includes an indication of the periodicity and the quantity of reference signal occasions.

In some examples, the UE reference signal component 750 may be configured as or otherwise support a means for determining a mapping between one or both of the periodicity and the quantity of reference signal occasions and at least one of the range of Doppler frequencies, the resolution within the range of Doppler frequencies, or a quantity of quantized frequencies within the range of Doppler frequencies, where the configuration message indicates one or more of the range of Doppler frequencies, the resolution associated with the range of Doppler frequencies, or the quantity of the parameters for the first network node to report based on indicating one or both of the periodicity and the quantity of reference signal occasions.

In some examples, the corresponding DFT vectors each include a DFT basis representative of a quantized frequency of the one or more quantized frequencies.

In some examples, the Doppler coefficient component 755 may be configured as or otherwise support a means for determining a respective Doppler coefficient for each of the corresponding DFT vectors, where the report further includes the respective Doppler coefficients.

In some examples, the UE Doppler range component 760 may be configured as or otherwise support a means for determining a highest Doppler frequency and a lowest Doppler frequency based on estimating the communications channel, where the highest Doppler frequency and the lowest Doppler frequency are within the range of Doppler frequencies, and where the report further includes an indication of the highest Doppler frequency and the lowest Doppler frequency.

In some examples, the UE Doppler range component 760 may be configured as or otherwise support a means for receiving a medium access control-control element including an indication of a highest Doppler frequency and a lowest Doppler frequency, where the highest Doppler frequency and the lowest Doppler frequency are within the range of Doppler frequencies.

In some examples, the range of Doppler frequencies is divided into a set of multiple portions each corresponding to a respective quantized frequency and a quantity of the portions and a size of the portions are based on the range of Doppler frequencies and the resolution associated with the range of Doppler frequencies.

In some examples, the report includes a CSI report and the configuration message is included as part of a CSI report configuration message.

In some examples, the set of multiple reference signals includes a set of multiple CSI-RSs or a set of multiple TRSs.

Figure 8:
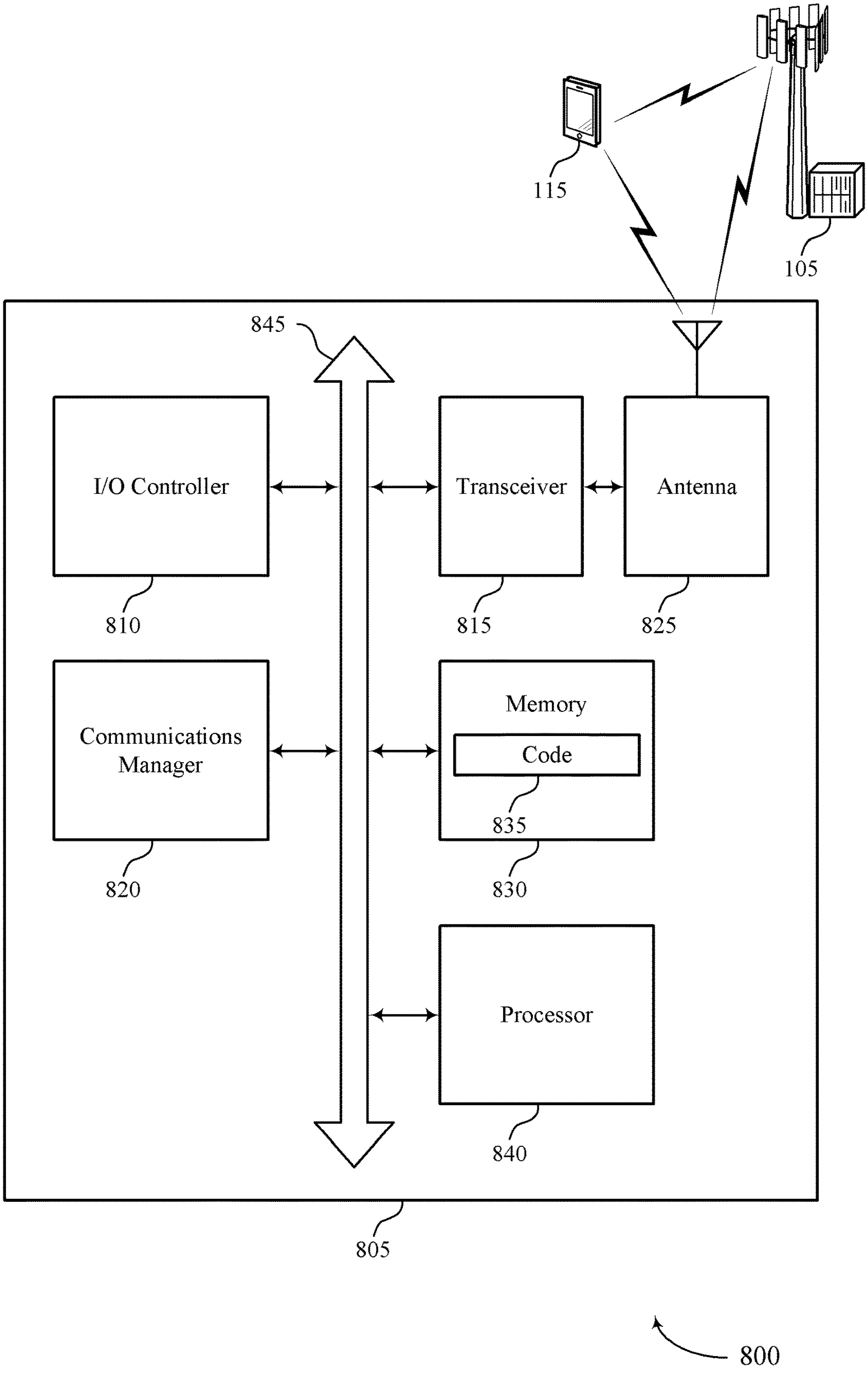
FIG. 8 shows a diagram of a system including a device that supports temporal domain precoding configuration in accordance with one or more aspects of the present disclosure.

FIG. 8 shows a diagram of a system 800 including a device 805 that supports temporal domain precoding configuration in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting temporal domain precoding configuration). For example, the device 805 or a component of the device 805 may include a processor 840 and memory 830 coupled with or to the processor 840, the processor 840 and memory 830 configured to perform various functions described herein.

The communications manager 820 may support wireless communications at a first network node in accordance with examples as disclosed herein. For example, the communications manager 820 may be configured as or otherwise support a means for receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report. The communications manager 820 may be configured as or otherwise support a means for estimating a communications channel between the first network node and a second network node based on receiving a set of multiple reference signals. The communications manager 820 may be configured as or otherwise support a means for selecting, based on the quantity of the parameters for the first network node to report and estimating the communications channel, one or more quantized frequencies within the range of Doppler frequencies. The communications manager 820 may be configured as or otherwise support a means for determining, for each selected quantized frequency within the range of Doppler frequencies, a corresponding DFT vector, where the parameters for the temporal domain precoder include the corresponding DFT vector for each selected quantized frequency within the range of Doppler frequencies. The communications manager 820 may be configured as or otherwise support a means for transmitting the report including the parameters for the temporal domain precoder.

By including or configuring the communications manager 820 in accordance with examples as described herein, the device 805 may support techniques for improved communication reliability, reduced power consumption, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of temporal domain precoding configuration as described herein, or the processor 840 and the memory 830 may be otherwise configured to perform or support such operations.

Figure 9:
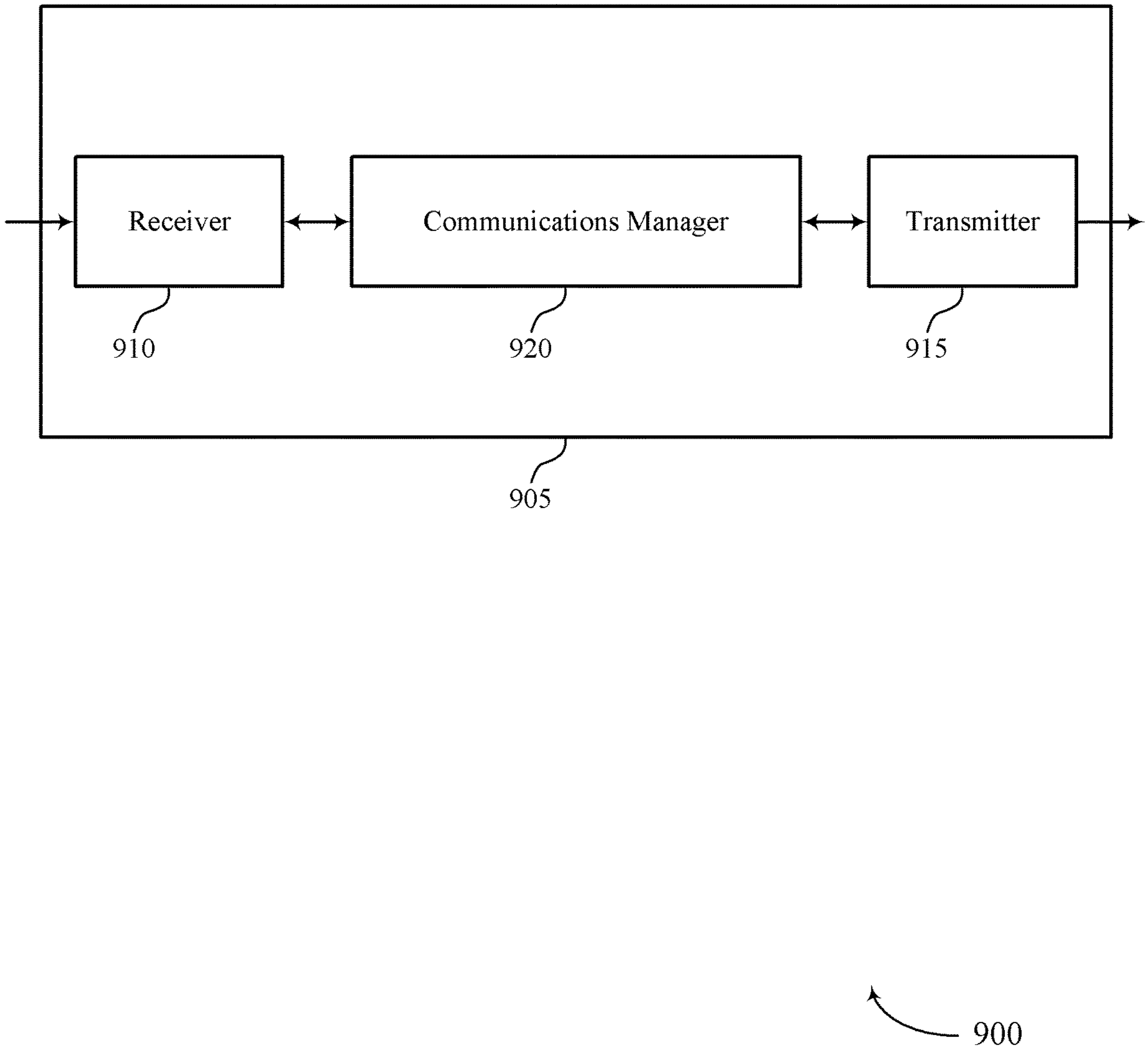
FIGS. 9 and 10 show block diagrams of devices that support temporal domain precoding configuration in accordance with one or more aspects of the present disclosure.

FIG. 9 shows a block diagram 900 of a device 905 that supports temporal domain precoding configuration in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of temporal domain precoding configuration as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a second network node in accordance with examples as disclosed herein. For example, the communications manager 920 may be configured as or otherwise support a means for transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report. The communications manager 920 may be configured as or otherwise support a means for transmitting a set of multiple reference signals. The communications manager 920 may be configured as or otherwise support a means for receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and reduced power consumption.

Figure 10:
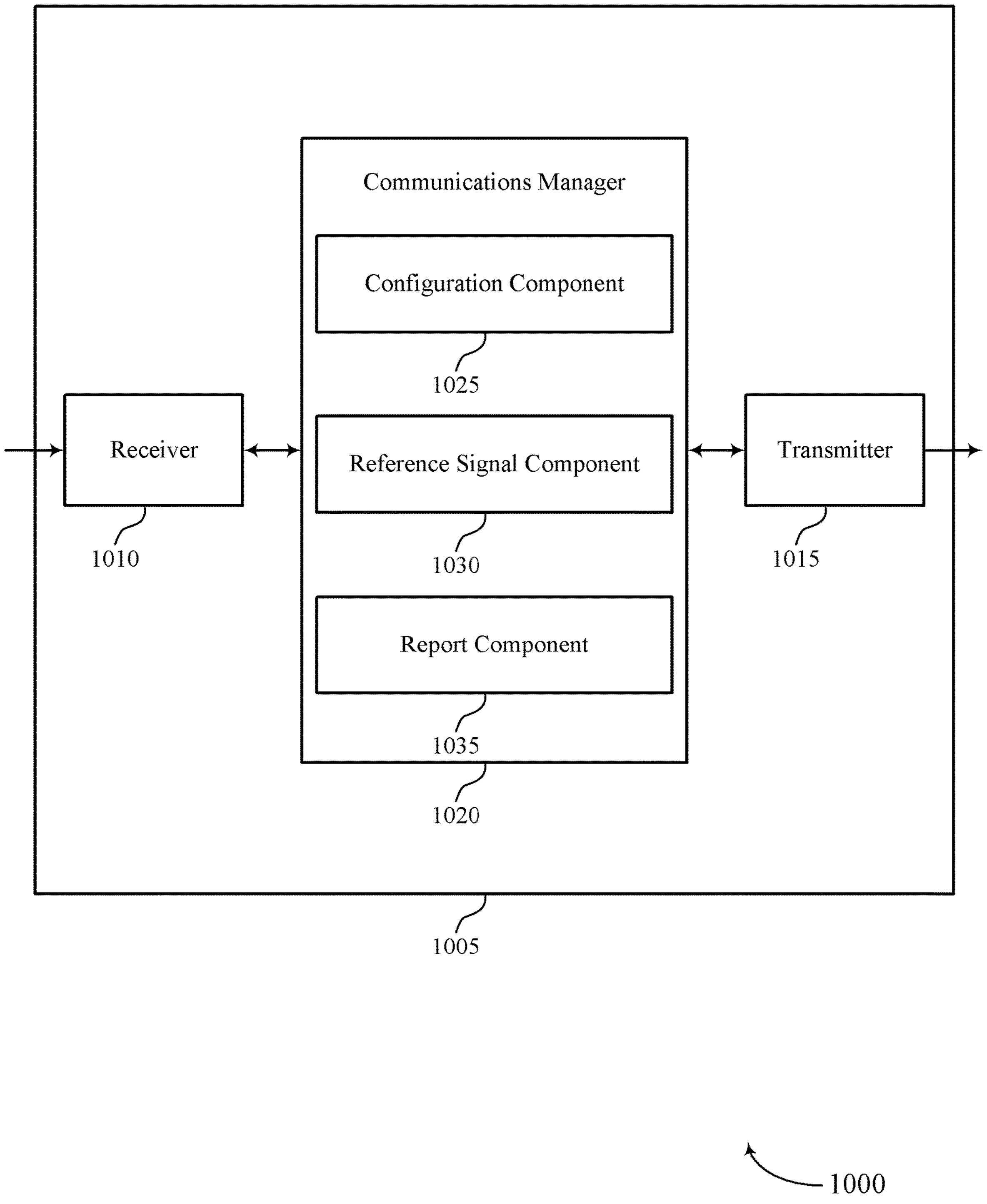

FIG. 10 shows a block diagram 1000 of a device 1005 that supports temporal domain precoding configuration in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of temporal domain precoding configuration as described herein. For example, the communications manager 1020 may include a configuration component 1025, a reference signal component 1030, a report component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a second network node in accordance with examples as disclosed herein. The configuration component 1025 may be configured as or otherwise support a means for transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report. The reference signal component 1030 may be configured as or otherwise support a means for transmitting a set of multiple reference signals. The report component 1035 may be configured as or otherwise support a means for receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

Figure 11:
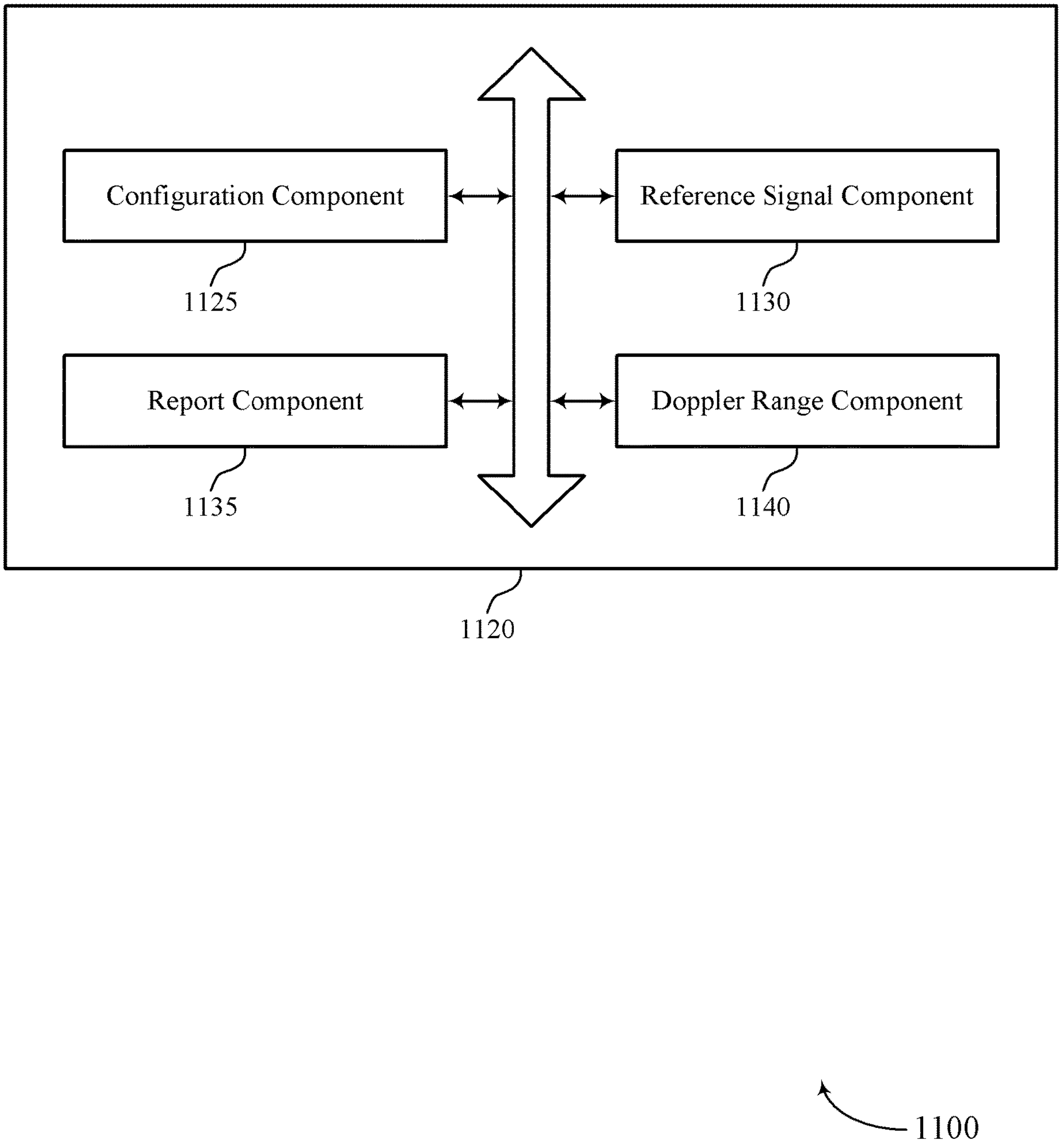
FIG. 11 shows a block diagram of a communications manager that supports temporal domain precoding configuration in accordance with one or more aspects of the present disclosure.

FIG. 11 shows a block diagram 1100 of a communications manager 1120 that supports temporal domain precoding configuration in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of temporal domain precoding configuration as described herein. For example, the communications manager 1120 may include a configuration component 1125, a reference signal component 1130, a report component 1135, a Doppler range component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a second network node in accordance with examples as disclosed herein. The configuration component 1125 may be configured as or otherwise support a means for transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report. The reference signal component 1130 may be configured as or otherwise support a means for transmitting a set of multiple reference signals. The report component 1135 may be configured as or otherwise support a means for receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

In some examples, to support transmitting the set of multiple reference signals, the reference signal component 1130 may be configured as or otherwise support a means for transmitting the set of multiple reference signals according to a periodicity and a quantity of reference signal occasions, where the quantity of reference signal occasions is greater than one.

In some examples, the configuration message further includes an indication of the periodicity and the quantity of reference signal occasions.

In some examples, one or both of the periodicity and the quantity of reference signal occasions maps to at least one of the range of Doppler frequencies, the resolution within the range of Doppler frequencies, or a quantity of quantized frequencies within the range of Doppler frequencies and the configuration message indicates one or more of the range of Doppler frequencies, the resolution associated with the range of Doppler frequencies, or the quantity of the parameters for the first network node to report based on indicating one or both of the periodicity and the quantity of reference signal occasions.

In some examples, the corresponding DFT vectors each include a DFT basis representative of a quantized frequency of the one or more quantized frequencies.

In some examples, the report further includes a respective Doppler coefficient for each of the corresponding DFT vectors.

In some examples, the report further includes an indication of a highest Doppler frequency and a lowest Doppler frequency, the highest Doppler frequency and the lowest Doppler frequency are within the range of Doppler frequencies.

In some examples, the Doppler range component 1140 may be configured as or otherwise support a means for transmitting a medium access control-control element including an indication of a highest Doppler frequency and a lowest Doppler frequency, where the highest Doppler frequency and the lowest Doppler frequency are within the range of Doppler frequencies.

In some examples, the range of Doppler frequencies is divided into a set of multiple portions each corresponding to a respective quantized frequency and a quantity of the portions and a size of the portions are based on the range of Doppler frequencies and the resolution associated with the range of Doppler frequencies.

In some examples, the report includes a CSI report and the configuration message is included as part of a CSI report configuration message.

In some examples, the set of multiple reference signals includes a set of multiple CSI-RSs or a set of multiple TRSs.

Figure 12:
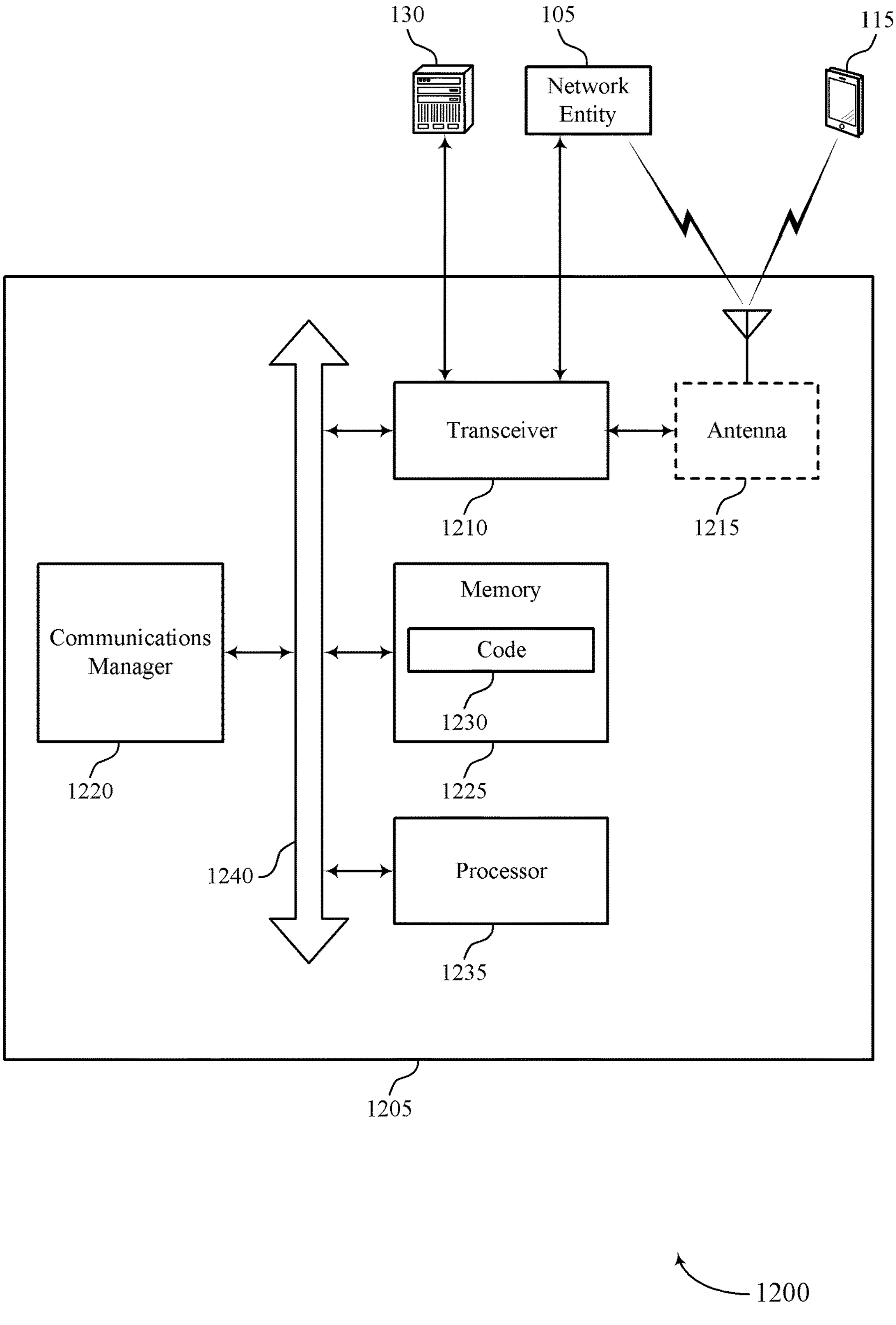
FIG. 12 shows a diagram of a system including a device that supports temporal domain precoding configuration in accordance with one or more aspects of the present disclosure.

FIG. 12 shows a diagram of a system 1200 including a device 1205 that supports temporal domain precoding configuration in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting temporal domain precoding configuration). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a second network node in accordance with examples as disclosed herein. For example, the communications manager 1220 may be configured as or otherwise support a means for transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report. The communications manager 1220 may be configured as or otherwise support a means for transmitting a set of multiple reference signals. The communications manager 1220 may be configured as or otherwise support a means for receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies.

By including or configuring the communications manager 1220 in accordance with examples as described herein, the device 1205 may support techniques for improved communication reliability, reduced power consumption, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of temporal domain precoding configuration as described herein, or the processor 1235 and the memory 1225 may be otherwise configured to perform or support such operations.

Figure 13:
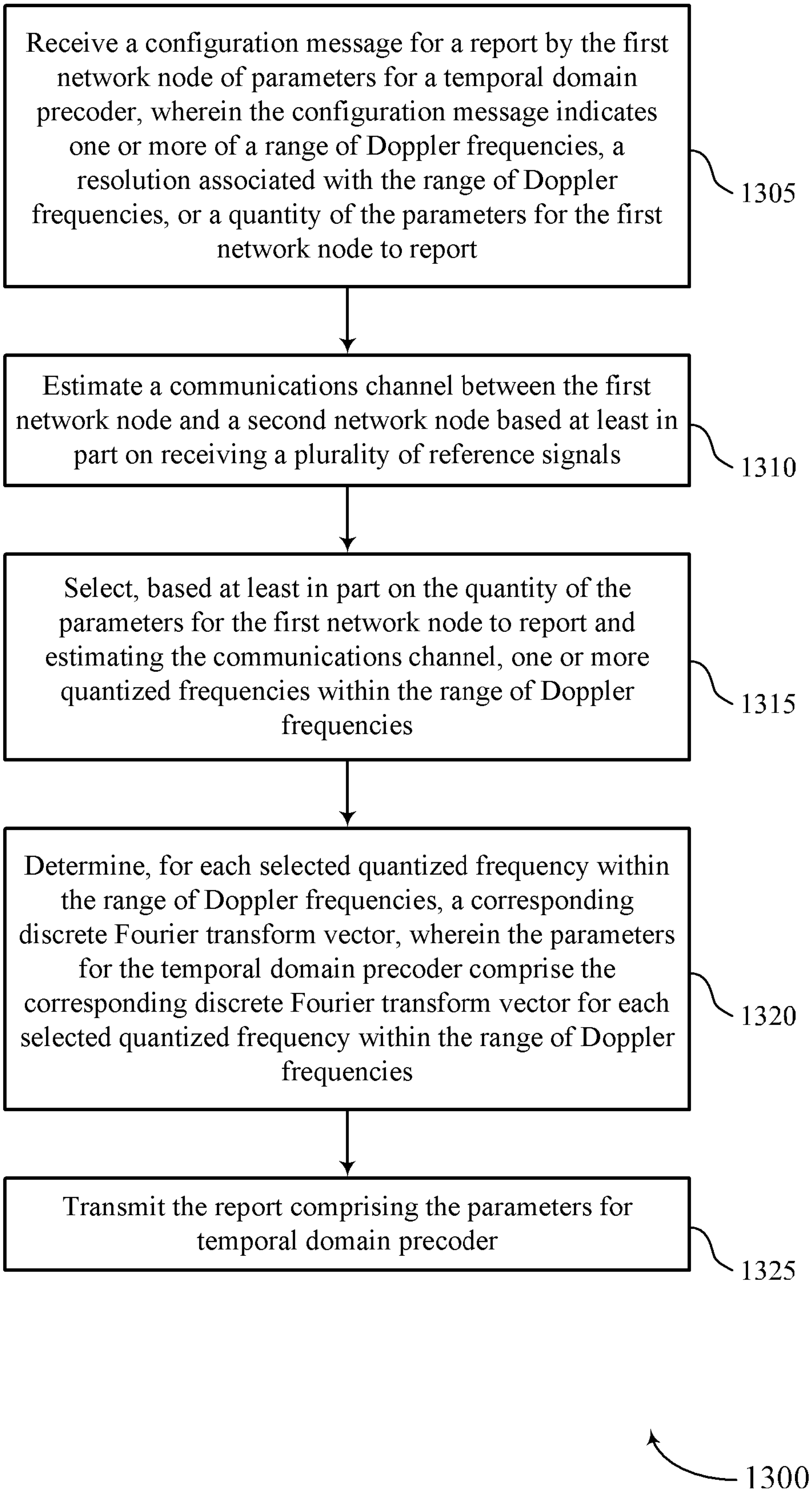
FIGS. 13 through 17 show flowcharts illustrating methods that support temporal domain precoding configuration in accordance with one or more aspects of the present disclosure.

FIG. 13 shows a flowchart illustrating a method 1300 that supports temporal domain precoding configuration in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report. The operations of 1305 may be performed in accordance with examples as disclosed herein. In some examples, aspects of the operations of 1305 may be performed by a UE configuration component 725 as described with reference to FIG. 7. Additionally or alternatively, means for performing 1305 may, but not necessarily, include, for example, antenna 825, transceiver 815, communications manager 820, memory 830 (including code 835), processor 840 and/or bus 845.

At 1310, the method may include estimating a communications channel between the first network node and a second network node based on receiving a set of multiple reference signals. The operations of 1310 may be performed in accordance with examples as disclosed herein. In some examples, aspects of the operations of 1310 may be performed by a measurement component 730 as described with reference to FIG. 7. Additionally or alternatively, means for performing 1310 may, but not necessarily, include, for example, antenna 825, transceiver 815, communications manager 820, memory 830 (including code 835), processor 840 and/or bus 845.

At 1315, the method may include selecting, based on the quantity of the parameters for the first network node to report and estimating the communications channel, one or more quantized frequencies within the range of Doppler frequencies. The operations of 1315 may be performed in accordance with examples as disclosed herein. In some examples, aspects of the operations of 1315 may be performed by a bin selection component 735 as described with reference to FIG. 7. Additionally or alternatively, means for performing 1315 may, but not necessarily, include, for example, antenna 825, transceiver 815, communications manager 820, memory 830 (including code 835), processor 840 and/or bus 845.

At 1320, the method may include determining, for each selected quantized frequency within the range of Doppler frequencies, a corresponding DFT vector, where the parameters for the temporal domain precoder include the corresponding DFT vector for each selected quantized frequency within the range of Doppler frequencies. The operations of 1320 may be performed in accordance with examples as disclosed herein. In some examples, aspects of the operations of 1320 may be performed by a Doppler basis component 740 as described with reference to FIG. 7. Additionally or alternatively, means for performing 1320 may, but not necessarily, include, for example, antenna 825, transceiver 815, communications manager 820, memory 830 (including code 835), processor 840 and/or bus 845.

At 1325, the method may include transmitting the report including the parameters for the temporal domain precoder. The operations of 1325 may be performed in accordance with examples as disclosed herein. In some examples, aspects of the operations of 1325 may be performed by a UE report component 745 as described with reference to FIG. 7. Additionally or alternatively, means for performing 1325 may, but not necessarily, include, for example, antenna 825, transceiver 815, communications manager 820, memory 830 (including code 835), processor 840 and/or bus 845.

Figure 14:
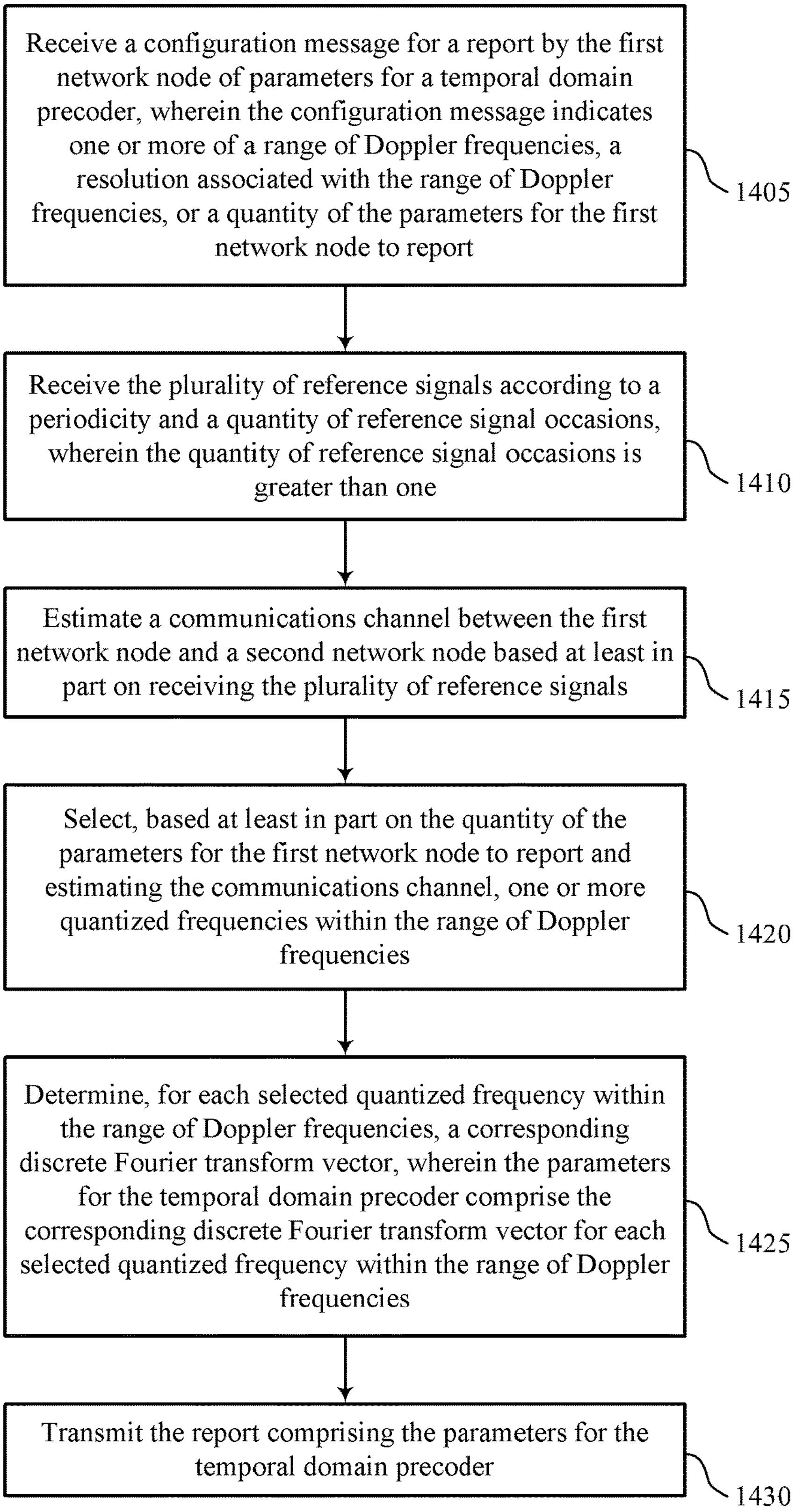

FIG. 14 shows a flowchart illustrating a method 1400 that supports temporal domain precoding configuration in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report. The operations of 1405 may be performed in accordance with examples as disclosed herein. In some examples, aspects of the operations of 1405 may be performed by a UE configuration component 725 as described with reference to FIG. 7. Additionally or alternatively, means for performing 1405 may, but not necessarily, include, for example, antenna 825, transceiver 815, communications manager 820, memory 830 (including code 835), processor 840 and/or bus 845.

At 1410, the method may include receiving the set of multiple reference signals according to a periodicity and a quantity of reference signal occasions, where the quantity of reference signal occasions is greater than one. The operations of 1410 may be performed in accordance with examples as disclosed herein. In some examples, aspects of the operations of 1410 may be performed by a UE reference signal component 750 as described with reference to FIG. 7. Additionally or alternatively, means for performing 1410 may, but not necessarily, include, for example, antenna 825, transceiver 815, communications manager 820, memory 830 (including code 835), processor 840 and/or bus 845.

At 1415, the method may include estimating a communications channel between the first network node and a second network node based on receiving the set of multiple reference signals. The operations of 1415 may be performed in accordance with examples as disclosed herein. In some examples, aspects of the operations of 1415 may be performed by a measurement component 730 as described with reference to FIG. 7. Additionally or alternatively, means for performing 1415 may, but not necessarily, include, for example, antenna 825, transceiver 815, communications manager 820, memory 830 (including code 835), processor 840 and/or bus 845.

At 1420, the method may include selecting, based on the quantity of the parameters for the first network node to report and estimating the communications channel, one or more quantized frequencies within the range of Doppler frequencies. The operations of 1420 may be performed in accordance with examples as disclosed herein. In some examples, aspects of the operations of 1420 may be performed by a bin selection component 735 as described with reference to FIG. 7. Additionally or alternatively, means for performing 1420 may, but not necessarily, include, for example, antenna 825, transceiver 815, communications manager 820, memory 830 (including code 835), processor 840 and/or bus 845.

At 1425, the method may include determining, for each selected quantized frequency within the range of Doppler frequencies, a corresponding DFT vector, where the parameters for the temporal domain precoder include the corresponding DFT vector for each selected quantized frequency within the range of Doppler frequencies. The operations of 1425 may be performed in accordance with examples as disclosed herein. In some examples, aspects of the operations of 1425 may be performed by a Doppler basis component 740 as described with reference to FIG. 7. Additionally or alternatively, means for performing 1425 may, but not necessarily, include, for example, antenna 825, transceiver 815, communications manager 820, memory 830 (including code 835), processor 840 and/or bus 845.

At 1430, the method may include transmitting the report including the parameters for the temporal domain precoder. The operations of 1430 may be performed in accordance with examples as disclosed herein. In some examples, aspects of the operations of 1430 may be performed by a UE report component 745 as described with reference to FIG. 7. Additionally or alternatively, means for performing 1430 may, but not necessarily, include, for example, antenna 825, transceiver 815, communications manager 820, memory 830 (including code 835), processor 840 and/or bus 845.

Figure 15:
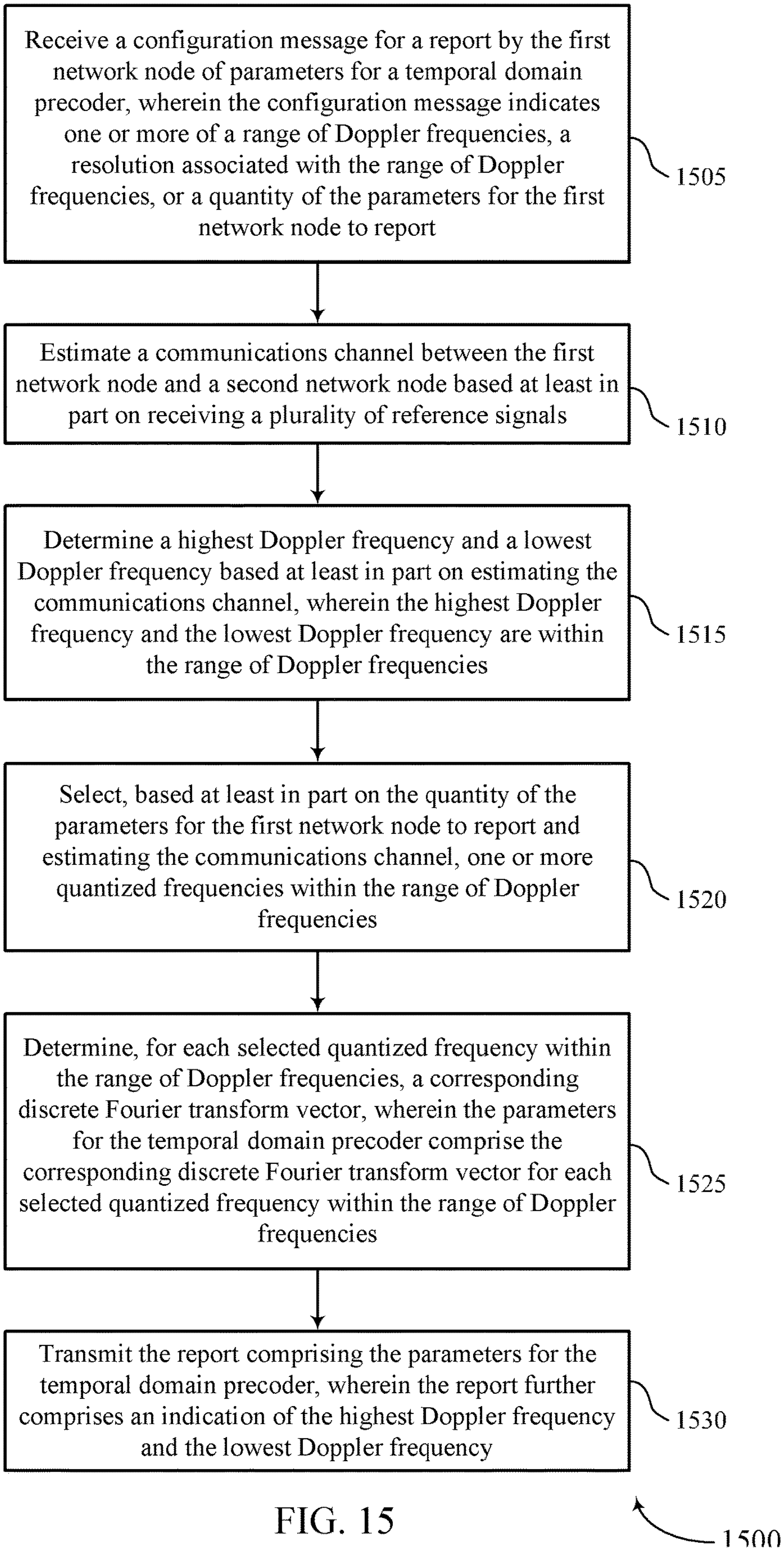

FIG. 15 shows a flowchart illustrating a method 1500 that supports temporal domain precoding configuration in accordance with one or more aspects of the present disclosure.

The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a configuration message for a report by the first network node of parameters for a temporal domain precoder, where the configuration message indicates one or more of a range of Doppler frequencies, a resolution associated with the range of Doppler frequencies, or a quantity of the parameters for the first network node to report. The operations of 1505 may be performed in accordance with examples as disclosed herein. In some examples, aspects of the operations of 1505 may be performed by a UE configuration component 725 as described with reference to FIG. 7. Additionally or alternatively, means for performing 1505 may, but not necessarily, include, for example, antenna 825, transceiver 815, communications manager 820, memory 830 (including code 835), processor 840 and/or bus 845.

At 1510, the method may include estimating a communications channel between the first network node and a second network node based on receiving a set of multiple reference signals. The operations of 1510 may be performed in accordance with examples as disclosed herein. In some examples, aspects of the operations of 1510 may be performed by a measurement component 730 as described with reference to FIG. 7. Additionally or alternatively, means for performing 1510 may, but not necessarily, include, for example, antenna 825, transceiver 815, communications manager 820, memory 830 (including code 835), processor 840 and/or bus 845.

At 1515, the method may include determining a highest Doppler frequency and a lowest Doppler frequency based on estimating the communications channel, where the highest Doppler frequency and the lowest Doppler frequency are within the range of Doppler frequencies. The operations of 1515 may be performed in accordance with examples as disclosed herein. In some examples, aspects of the operations of 1515 may be performed by a UE Doppler range component 760 as described with reference to FIG. 7. Additionally or alternatively, means for performing 1515 may, but not necessarily, include, for example, antenna 825, transceiver 815, communications manager 820, memory 830 (including code 835), processor 840 and/or bus 845.

At 1520, the method may include selecting, based on the quantity of the parameters for the first network node to report and estimating the communications channel, one or more quantized frequencies within the range of Doppler frequencies. The operations of 1520 may be performed in accordance with examples as disclosed herein. In some examples, aspects of the operations of 1520 may be performed by a bin selection component 735 as described with reference to FIG. 7. Additionally or alternatively, means for performing 1520 may, but not necessarily, include, for example, antenna 825, transceiver 815, communications manager 820, memory 830 (including code 835), processor 840 and/or bus 845.

At 1525, the method may include determining, for each selected quantized frequency within the range of Doppler frequencies, a corresponding DFT vector, where the parameters for the temporal domain precoder include the corresponding DFT vector for each selected quantized frequency within the range of Doppler frequencies. The operations of 1525 may be performed in accordance with examples as disclosed herein. In some examples, aspects of the operations of 1525 may be performed by a Doppler basis component 740 as described with reference to FIG. 7. Additionally or alternatively, means for performing 1525 may, but not necessarily, include, for example, antenna 825, transceiver 815, communications manager 820, memory 830 (including code 835), processor 840 and/or bus 845.

At 1530, the method may include transmitting the report including the parameters for the temporal domain precoder, where the report further includes an indication of the highest Doppler frequency and the lowest Doppler frequency. The operations of 1530 may be performed in accordance with examples as disclosed herein. In some examples, aspects of the operations of 1530 may be performed by a UE report component 745 as described with reference to FIG. 7. Additionally or alternatively, means for performing 1530 may, but not necessarily, include, for example, antenna 825, transceiver 815, communications manager 820, memory 830 (including code 835), processor 840 and/or bus 845.

Figure 16:
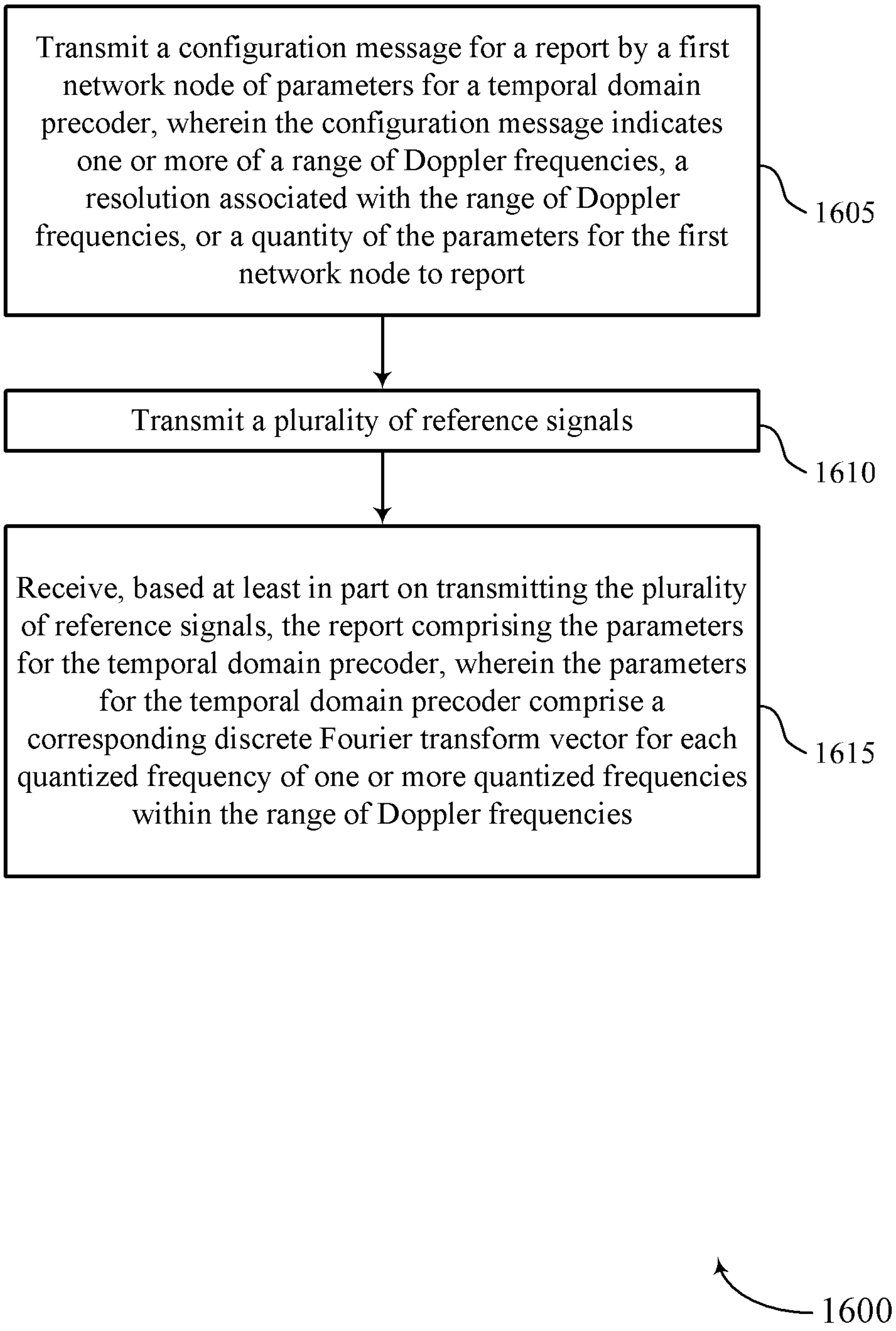

FIG. 16 shows a flowchart illustrating a method 1600 that supports temporal domain precoding configuration in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report. The operations of 1605 may be performed in accordance with examples as disclosed herein. In some examples, aspects of the operations of 1605 may be performed by a configuration component 1125 as described with reference to FIG. 11. Additionally or alternatively, means for performing 1605 may, but not necessarily, include, for example, antenna 1215, transceiver 1210, communications manager 1220, memory 1225 (including code 1230), processor 1235 and/or bus 1240.

At 1610, the method may include transmitting a set of multiple reference signals. The operations of 1610 may be performed in accordance with examples as disclosed herein. In some examples, aspects of the operations of 1610 may be performed by a reference signal component 1130 as described with reference to FIG. 11. Additionally or alternatively, means for performing 1610 may, but not necessarily, include, for example, antenna 1215, transceiver 1210, communications manager 1220, memory 1225 (including code 1230), processor 1235 and/or bus 1240.

At 1615, the method may include receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies. The operations of 1615 may be performed in accordance with examples as disclosed herein. In some examples, aspects of the operations of 1615 may be performed by a report component 1135 as described with reference to FIG. 11. Additionally or alternatively, means for performing 1615 may, but not necessarily, include, for example, antenna 1215, transceiver 1210, communications manager 1220, memory 1225 (including code 1230), processor 1235 and/or bus 1240.

Figure 17:
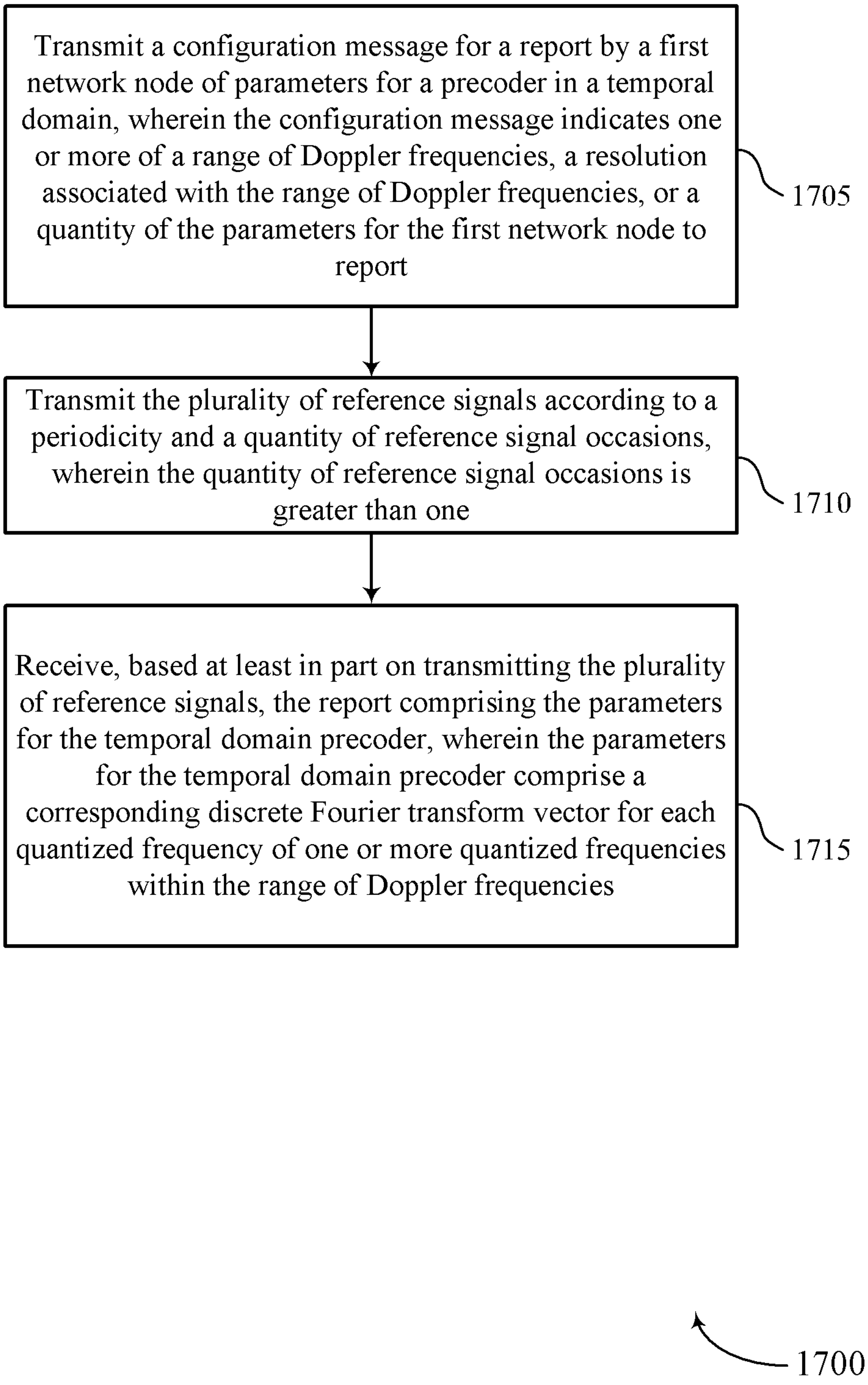

FIG. 17 shows a flowchart illustrating a method 1700 that supports temporal domain precoding configuration in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a configuration message for a report by a first network node of parameters for a temporal domain precoder, where the configuration message indicates one or more of a range of Doppler frequencies, a resolution associated with the range of Doppler frequencies, or a quantity of the parameters for the first network node to report. The operations of 1705 may be performed in accordance with examples as disclosed herein. In some examples, aspects of the operations of 1705 may be performed by a configuration component 1125 as described with reference to FIG. 11. Additionally or alternatively, means for performing 1705 may, but not necessarily, include, for example, antenna 1215, transceiver 1210, communications manager 1220, memory 1225 (including code 1230), processor 1235 and/or bus 1240.

At 1710, the method may include transmitting the set of multiple reference signals according to a periodicity and a quantity of reference signal occasions, where the quantity of reference signal occasions is greater than one. The operations of 1710 may be performed in accordance with examples as disclosed herein. In some examples, aspects of the operations of 1710 may be performed by a reference signal component 1130 as described with reference to FIG. 11. Additionally or alternatively, means for performing 1710 may, but not necessarily, include, for example, antenna 1215, transceiver 1210, communications manager 1220, memory 1225 (including code 1230), processor 1235 and/or bus 1240.

At 1715, the method may include receiving, based on transmitting the set of multiple reference signals, the report including the parameters for the temporal domain precoder, where the parameters for the temporal domain precoder include a corresponding DFT vector for each quantized frequency of one or more quantized frequencies within the range of Doppler frequencies. The operations of 1715 may be performed in accordance with examples as disclosed herein. In some examples, aspects of the operations of 1715 may be performed by a report component 1135 as described with reference to FIG. 11. Additionally or alternatively, means for performing 1715 may, but not necessarily, include, for example, antenna 1215, transceiver 1210, communications manager 1220, memory 1225 (including code 1230), processor 1235 and/or bus 1240.

The following provides an overview of aspects of the present disclosure:

Aspect 1: A method for wireless communications at a first network node, comprising: receiving a configuration message for a report by the first network node of parameters for a temporal domain precoder, wherein the configuration message indicates one or more of a range of Doppler frequencies, a resolution associated with the range of Doppler frequencies, or a quantity of the parameters for the first network node to report; estimating a communications channel between the first network node and a second network node based at least in part on receiving a plurality of reference signals; selecting, based at least in part on the quantity of the parameters for the first network node to report and estimating the communications channel, one or more quantized frequencies within the range of Doppler frequencies; determining, for each selected quantized frequency within the range of Doppler frequencies, a corresponding DFT vector, wherein the parameters for the temporal domain precoder comprise the corresponding DFT vector for each selected quantized frequency within the range of Doppler frequencies; and transmitting the report comprising the parameters for the temporal domain precoder.

Aspect 2: The method of aspect 1, wherein selecting the one or more quantized frequencies within the range of Doppler frequencies comprises: determining, for each directional beam of a set of directional beams or for each power delay profile of a set of power delay profiles, one or more Doppler frequencies that correspond to respective received power values that are above a threshold; and selecting, for each directional beam of the set or for each power delay profile of the set, the one or more quantized frequencies based at least on the one or more determined Doppler frequencies being within frequency ranges that include the one or more quantized frequencies.

Aspect 3: The method of any of aspects 1 through 2, wherein receiving the plurality of reference signals comprises: receiving the plurality of reference signals according to a periodicity and a quantity of reference signal occasions, wherein the quantity of reference signal occasions is greater than one.

Aspect 4: The method of aspect 3, further comprising: bundling the plurality of reference signals, wherein estimating the communications channel is based at least in part on the bundling.

Aspect 5: The method of any of aspects 3 through 4, wherein the configuration message further comprises an indication of the periodicity and the quantity of reference signal occasions.

Aspect 6: The method of any of aspects 3 through 5, further comprising: determining a mapping between one or both of the periodicity and the quantity of reference signal occasions and at least one of the range of Doppler frequencies, the resolution within the range of Doppler frequencies, or a quantity of quantized frequencies within the range of Doppler frequencies, wherein the configuration message indicates one or more of the range of Doppler frequencies, the resolution associated with the range of Doppler frequencies, or the quantity of the parameters for the first network node to report based at least in part on indicating one or both of the periodicity and the quantity of reference signal occasions.

Aspect 7: The method of any of aspects 1 through 6, wherein the corresponding DFT vectors each comprise a DFT basis representative of a quantized frequency of the one or more quantized frequencies.

Aspect 8: The method of any of aspects 1 through 7, further comprising: determining a respective Doppler coefficient for each of the corresponding DFT vectors, wherein the report further comprise the respective Doppler coefficients.

Aspect 9: The method of any of aspects 1 through 8, further comprising: determining a highest Doppler frequency and a lowest Doppler frequency based at least in part on estimating the communications channel, wherein the highest Doppler frequency and the lowest Doppler frequency are within the range of Doppler frequencies, and wherein the report further comprises an indication of the highest Doppler frequency and the lowest Doppler frequency.

Aspect 10: The method of any of aspects 1 through 9, further comprising: receiving a medium access control-control element comprising an indication of a highest Doppler frequency and a lowest Doppler frequency, wherein the highest Doppler frequency and the lowest Doppler frequency are within the range of Doppler frequencies.

Aspect 11: The method of any of aspects 1 through 10, wherein the range of Doppler frequencies is divided into a plurality of portions each corresponding to a respective quantized frequency and a quantity of the portions and a size of the portions are based at least in part on the range of Doppler frequencies and the resolution associated with the range of Doppler frequencies.

Aspect 12: The method of any of aspects 1 through 11, wherein the report comprises a CSI report and the configuration message is included as part of a CSI report configuration message.

Aspect 13: The method of any of aspects 1 through 12, wherein the plurality of reference signals comprises a plurality of CSI-RSs or a plurality of TRSs.

Aspect 14: A method for wireless communications at a second network node, comprising: transmitting a configuration message for a report by a first network node of parameters for a temporal domain precoder, wherein the configuration message indicates one or more of a range of Doppler frequencies, a resolution associated with the range of Doppler frequencies, or a quantity of the parameters for the first network node to report; transmitting a plurality of reference signals; and receiving, based at least in part on transmitting the plurality of reference signals, the report comprising the parameters for the temporal domain precoder, wherein the parameters for the temporal domain precoder comprise a corresponding DFT vector for each quantized frequency of one or more quantized frequencies within the range of Doppler frequencies.

Aspect 15: The method of aspect 14, wherein transmitting the plurality of reference signals comprises: transmitting the plurality of reference signals according to a periodicity and a quantity of reference signal occasions, wherein the quantity of reference signal occasions is greater than one.

Aspect 16: The method of aspect 15, wherein the configuration message further comprises an indication of the periodicity and the quantity of reference signal occasions.

Aspect 17: The method of any of aspects 15 through 16, wherein one or both of the periodicity and the quantity of reference signal occasions maps to at least one of the range of Doppler frequencies, the resolution within the range of Doppler frequencies, or a quantity of quantized frequencies within the range of Doppler frequencies and the configuration message indicates one or more of the range of Doppler frequencies, the resolution associated with the range of Doppler frequencies, or the quantity of the parameters for the first network node to report based at least in part on indicating one or both of the periodicity and the quantity of reference signal occasions.

Aspect 18: The method of any of aspects 14 through 17, wherein the corresponding DFT vectors each comprise a DFT basis representative of a quantized frequency of the one or more quantized frequencies.

Aspect 19: The method of any of aspects 14 through 18, wherein the report further comprises a respective Doppler coefficient for each of the corresponding DFT vectors.

Aspect 20: The method of any of aspects 14 through 19, wherein the report further comprises an indication of a highest Doppler frequency and a lowest Doppler frequency, the highest Doppler frequency and the lowest Doppler frequency are within the range of Doppler frequencies.

Aspect 21: The method of any of aspects 14 through 20, further comprising: transmitting a medium access control-control element comprising an indication of a highest Doppler frequency and a lowest Doppler frequency, wherein the highest Doppler frequency and the lowest Doppler frequency are within the range of Doppler frequencies.

Aspect 22: The method of any of aspects 14 through 21, wherein the range of Doppler frequencies is divided into a plurality of portions each corresponding to a respective quantized frequency and a quantity of the portions and a size of the portions are based at least in part on the range of Doppler frequencies and the resolution associated with the range of Doppler frequencies.

Aspect 23: The method of any of aspects 14 through 22, wherein the report comprises a CSI report and the configuration message is included as part of a CSI report configuration message.

Aspect 24: The method of any of aspects 14 through 23, wherein the plurality of reference signals comprises a plurality of CSI-RSs or a plurality of TRSs.

Aspect 25: An apparatus for wireless communications at a first network node, comprising memory, a transceiver, and at least one processor coupled with the memory and the transceiver, the at least one processor configured to cause the apparatus to perform a method of any of aspects 1 through 13.

Aspect 26: An apparatus for wireless communications at a first network node, comprising at least one means for performing a method of any of aspects 1 through 13.

Aspect 27: A non-transitory computer-readable medium storing code for wireless communications at a first network node, the code comprising instructions executable by a processor to perform a method of any of aspects 1 through 13.

Aspect 28: An apparatus for wireless communications at a second network node, comprising memory, a transceiver, and at least one processor coupled with the memory and the transceiver, the at least one processor configured to cause the apparatus to perform a method of any of aspects 14 through 24.

Aspect 29: An apparatus for wireless communications at a second network node, comprising at least one means for performing a method of any of aspects 14 through 24.

Aspect 30: A non-transitory computer-readable medium storing code for wireless communications at a second network node, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first network node, comprising:

receiving a configuration message for a report by the first network node of parameters for a temporal domain precoder, wherein the configuration message indicates one or more of a range of Doppler frequencies, a resolution associated with the range of Doppler frequencies, or a quantity of the parameters for the first network node to report;

estimating a communications channel between the first network node and a second network node based at least in part on receiving a plurality of reference signals;

selecting, based at least in part on the quantity of the parameters for the first network node to report and estimating the communications channel, one or more quantized frequencies within the range of Doppler frequencies;

determining, for each selected quantized frequency within the range of Doppler frequencies, a corresponding discrete Fourier transform vector, wherein the parameters for the temporal domain precoder comprise the corresponding discrete Fourier transform vector for each selected quantized frequency within the range of Doppler frequencies; and transmitting the report comprising the parameters for the temporal domain precoder.

2. The method of claim 1, wherein selecting the one or more quantized frequencies within the range of Doppler frequencies comprises:

determining, for each directional beam of a set of directional beams or for each power delay profile of a set of power delay profiles, one or more Doppler frequencies that correspond to respective received power values that are above a threshold; and selecting, for each directional beam of the set or for each power delay profile of the set, the one or more quantized frequencies based at least on the one or more determined Doppler frequencies being within frequency ranges that include the one or more quantized frequencies.

3. The method of claim 1, wherein receiving the plurality of reference signals comprises:

receiving the plurality of reference signals according to a periodicity and a quantity of reference signal occasions, wherein the quantity of reference signal occasions is greater than one.

4. The method of claim 3, further comprising:

bundling the plurality of reference signals, wherein estimating the communications channel is based at least in part on the bundling.

5. The method of claim 3, wherein the configuration message further comprises an indication of the periodicity and the quantity of reference signal occasions.

6. The method of claim 3, further comprising:

determining a mapping between one or both of the periodicity and the quantity of reference signal occasions and at least one of the range of Doppler frequencies, the resolution within the range of Doppler frequencies, or a quantity of quantized frequencies within the range of Doppler frequencies, wherein the configuration message indicates one or more of the range of Doppler frequencies, the resolution associated with the range of Doppler frequencies, or the quantity of the parameters for the first network node to report based at least in part on indicating one or both of the periodicity and the quantity of reference signal occasions.

7. The method of claim 1, wherein the corresponding discrete Fourier transform vectors each comprise a discrete Fourier transform basis representative of a quantized frequency of the one or more quantized frequencies.

8. The method of claim 1, further comprising:

determining a respective Doppler coefficient for each of the corresponding discrete Fourier transform vectors, wherein the report further comprises the respective Doppler coefficients.

9. The method of claim 1, further comprising:

determining a highest Doppler frequency and a lowest Doppler frequency based at least in part on estimating the communications channel, wherein the highest Doppler frequency and the lowest Doppler frequency are within the range of Doppler frequencies, and wherein the report further comprises an indication of the highest Doppler frequency and the lowest Doppler frequency.

10. The method of claim 1, further comprising:

receiving a medium access control-control element comprising an indication of a highest Doppler frequency and a lowest Doppler frequency, wherein the highest Doppler frequency and the lowest Doppler frequency are within the range of Doppler frequencies.

11. The method of claim 1, wherein:

the range of Doppler frequencies is divided into a plurality of portions each corresponding to a respective quantized frequency; and a quantity of the portions and a size of the portions are based at least in part on the range of Doppler frequencies and the resolution associated with the range of Doppler frequencies.

12. The method of claim 1, wherein the report comprises a channel state information report and the configuration message is included as part of a channel state information report configuration message.

13. The method of claim 1, wherein the plurality of reference signals comprises a plurality of channel state information reference signals or a plurality of tracking reference signals.

14. A method for wireless communications at a second network node, comprising:

transmitting a configuration message for a report by a first network node of parameters for a temporal domain precoder, wherein the configuration message indicates one or more of a range of Doppler frequencies, a resolution associated with the range of Doppler frequencies, or a quantity of the parameters for the first network node to report;

transmitting a plurality of reference signals; and receiving, based at least in part on transmitting the plurality of reference signals, the report comprising the parameters for the temporal domain precoder, wherein the parameters for the temporal domain precoder comprise a corresponding discrete Fourier transform vector for each quantized frequency of one or more quantized frequencies within the range of Doppler frequencies.

15. The method of claim 14, wherein transmitting the plurality of reference signals comprises:

transmitting the plurality of reference signals according to a periodicity and a quantity of reference signal occasions, wherein the quantity of reference signal occasions is greater than one.

16. The method of claim 15, wherein the configuration message further comprises an indication of the periodicity and the quantity of reference signal occasions.

17. The method of claim 15, wherein:

one or both of the periodicity and the quantity of reference signal occasions maps to at least one of the range of Doppler frequencies, the resolution within the range of Doppler frequencies, or a quantity of quantized frequencies within the range of Doppler frequencies; and the configuration message indicates one or more of the range of Doppler frequencies, the resolution associated with the range of Doppler frequencies, or the quantity of the parameters for the first network node to report based at least in part on indicating one or both of the periodicity and the quantity of reference signal occasions.

18. The method of claim 14, wherein the corresponding discrete Fourier transform vectors each comprise a discrete Fourier transform basis representative of a quantized frequency of the one or more quantized frequencies.

19. The method of claim 14, wherein the report further comprises a respective Doppler coefficient for each of the corresponding discrete Fourier transform vectors.

20. The method of claim 14, wherein the report further comprises an indication of a highest Doppler frequency and a lowest Doppler frequency, the highest Doppler frequency and the lowest Doppler frequency are within the range of Doppler frequencies.

21. The method of claim 14, further comprising:

transmitting a medium access control-control element comprising an indication of a highest Doppler frequency and a lowest Doppler frequency, wherein the highest Doppler frequency and the lowest Doppler frequency are within the range of Doppler frequencies.

22. The method of claim 14, wherein:

the range of Doppler frequencies is divided into a plurality of portions each corresponding to a respective quantized frequency; and a quantity of the portions and a size of the portions are based at least in part on the range of Doppler frequencies and the resolution associated with the range of Doppler frequencies.

23. The method of claim 14, wherein the report comprises a channel state information report and the configuration message is included as part of a channel state information report configuration message.

24. The method of claim 14, wherein the plurality of reference signals comprises a plurality of channel state information reference signals or a plurality of tracking reference signals.

25. An apparatus for wireless communications at a first network node, comprising:

memory;

a transceiver; and at least one processor of the first network node, the at least one processor coupled with the memory and the transceiver, and the at least one processor configured to cause the apparatus to:

receive, via the transceiver, a configuration message for a report by the first network node of parameters for a temporal domain precoder, wherein the configuration message indicates one or more of a range of Doppler frequencies, a resolution associated with the range of Doppler frequencies, or a quantity of the parameters for the first network node to report;

estimate a communications channel between the first network node and a second network node based at least in part on receiving, via the transceiver, a plurality of reference signals;

select, based at least in part on the quantity of the parameters for the first network node to report and estimating the communications channel, one or more quantized frequencies within the range of Doppler frequencies;

determine, for each selected quantized frequency within the range of Doppler frequencies, a corresponding discrete Fourier transform vector, wherein the parameters for the temporal domain precoder comprise the corresponding discrete Fourier transform vector for each selected quantized frequency within the range of Doppler frequencies; and transmit, via the transceiver, the report comprising the parameters for the temporal domain precoder.

26. The apparatus of claim 25, wherein, to select the one or more quantized frequencies within the range of Doppler frequencies, the at least one processor is configured to cause the apparatus to:

determine, for each directional beam of a set of directional beams or for each power delay profile of a set of power delay profiles, one or more Doppler frequencies that correspond to respective received power values that are above a threshold; and select, for each directional beam of the set or for each power delay profile of the set, the one or more quantized frequencies based at least on the one or more determined Doppler frequencies being within frequency ranges that include the one or more quantized frequencies.

27. The apparatus of claim 25, wherein the corresponding discrete Fourier transform vectors each comprise a discrete Fourier transform basis representative of a quantized frequency of the one or more quantized frequencies.

28. The apparatus of claim 25, wherein the at least on processor is further configured to cause the apparatus to:

determine a respective Doppler coefficient for each of the corresponding discrete Fourier transform vectors, wherein the report further comprises the respective Doppler coefficients.

29. An apparatus for wireless communications at a second network node, comprising:

memory;

a transceiver; and at least one processor of the second network node, the at least one processor coupled with the memory and the transceiver, and the at least one processor configured to cause the apparatus to:

transmit, via the transceiver, a configuration message for a report by a first network node of parameters for a temporal domain precoder, wherein the configuration message indicates one or more of a range of Doppler frequencies, a resolution associated with the range of Doppler frequencies, or a quantity of the parameters for the first network node to report;

transmit, via the transceiver, a plurality of reference signals; and receive, via the transceiver and based at least in part on transmitting the plurality of reference signals, the report comprising the parameters for the temporal domain precoder, wherein the parameters for the temporal domain precoder comprise a corresponding discrete Fourier transform vector for each quantized frequency of one or more quantized frequencies within the range of Doppler frequencies.

30. The apparatus of claim 29, wherein the corresponding discrete Fourier transform vectors each comprise a discrete Fourier transform basis representative of a quantized frequency of the one or more quantized frequencies.

* * * * *